United States Patent
Damnjanovic et al.

(10) Patent No.: US 10,425,865 B2
(45) Date of Patent: Sep. 24, 2019

(54) CHANNEL QUALITY FEEDBACK IN SATELLITE COMMUNICATION SYSTEMS

(71) Applicant: QUALCOMM Incorporated, San Diego, CA (US)

(72) Inventors: Jelena Damnjanovic, Del Mar, CA (US); Gene Wesley Marsh, Encinitas, CA (US); Fatih Ulupinar, San Diego, CA (US); Qiang Wu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 86 days.

(21) Appl. No.: 15/042,134

(22) Filed: Feb. 11, 2016

(65) Prior Publication Data
US 2017/0238216 A1  Aug. 17, 2017

(51) Int. Cl.
*H04W 36/00* (2009.01)
*H04B 17/309* (2015.01)
*H04W 16/28* (2009.01)
*H04B 7/185* (2006.01)
*H04L 1/00* (2006.01)
(Continued)

(52) U.S. Cl.
CPC .... *H04W 36/0072* (2013.01); *H04B 7/18541* (2013.01); *H04B 17/309* (2015.01); *H04L 1/0026* (2013.01); *H04W 16/28* (2013.01); *H04W 36/30* (2013.01); *H04L 1/0003* (2013.01); *H04W 84/06* (2013.01)

(58) Field of Classification Search
CPC ............ H04B 7/18513; H04B 7/18539; H04B 7/18563; H04B 7/2041; H04B 7/18541; H04B 7/1856; H04B 7/18523; H04B 7/18567; H04B 7/18508; H04B 7/1851; H04B 7/18534; H04B 7/18517; H04B 7/18528; H04B 7/1853
See application file for complete search history.

(56) References Cited

U.S. PATENT DOCUMENTS 6,233,456 B1 * 5/2001 Schiff ................ H04B 7/18541
455/436
6,246,874 B1 * 6/2001 Voce .................. H04B 7/18541
455/13.1

(Continued)

FOREIGN PATENT DOCUMENTS

| EP | 0808034 A2 | 11/1997 |
|---|---|---|
| WO | WO-9814026 A1 | 4/1998 |
| WO | WO-03026189 A1 | 3/2003 |

OTHER PUBLICATIONS

International Search Report and Written Opinion—PCT/US2017/013206—ISA/EPO—dated Apr. 26, 2017.

*Primary Examiner* — Julio R Perez
(74) *Attorney, Agent, or Firm* — Paradice and Li LLP

(57) ABSTRACT

A method and apparatus for operating a user terminal in a satellite communication system during inter-beam handovers. In some aspects, the user terminal may determine an occurrence of an inter-beam handover for switching communication with a network controller of the satellite communication system from a first beam to a second beam. The user terminal measures a channel quality of the second beam based at least in part on the occurrence of the inter-beam handover, and sends the channel quality measurement to the controller via a reverse-link communication.

26 Claims, 19 Drawing Sheets

(51) Int. Cl.
*H04W 36/30* (2009.01)
*H04W 84/06* (2009.01)

(56) References Cited

U.S. PATENT DOCUMENTS

| | | | |
|---|---|---|---|
| 8,116,253 | B2 | 2/2012 | Anderson |
| 8,463,178 | B2 * | 6/2013 | Monte ................ H04B 7/18513 |
| | | | 455/12.1 |
| 8,867,493 | B2 | 10/2014 | Gorokhov et al. |
| 9,479,993 | B2 * | 10/2016 | Benammar ........... H04W 36/30 |
| 2014/0055302 | A1 | 2/2014 | Jia |
| 2014/0286256 | A1 | 9/2014 | Chowdhury et al. |
| 2015/0024677 | A1 * | 1/2015 | Gopal .................. H04B 7/2041 |
| | | | 455/13.1 |
| 2016/0323800 | A1 * | 11/2016 | Ulupinar ............... H04W 36/38 |
| 2017/0099120 | A1 * | 4/2017 | Damnjanovic ....... H04L 1/1822 |

* cited by examiner

CHANNEL QUALITY FEEDBACK IN SATELLITE COMMUNICATION SYSTEMS

INTRODUCTION

Various aspects described herein relate to satellite communications, and more particularly to improving satellite communications during inter-beam handovers.

Conventional satellite-based communication systems include gateways and one or more satellites to relay communication signals between the gateways and one or more user terminals. A gateway is an Earth station having an antenna for transmitting signals to, and receiving signals from, communication satellites. A gateway provides communication links, using satellites, for connecting a user terminal to other user terminals or users of other communication systems, such as a public switched telephone network, the internet and various public and/or private networks. A satellite is an orbiting receiver and repeater used to relay information.

A satellite can receive signals from and transmit signals to a user terminal provided the user terminal is within the "footprint" of the satellite. The footprint of a satellite is the geographic region on the surface of the Earth within the range of signals of the satellite. The footprint is usually geographically divided into "beams," through the use of one or more antennas. Each beam covers a particular geographic region within the footprint. Beams may be directed so that more than one beam from the same satellite covers the same specific geographic region.

Geosynchronous satellites have long been used for communications. A geosynchronous satellite is stationary relative to a given location on the Earth, and thus there is little timing shift and frequency shift in radio signal propagation between a communication transceiver on the Earth and the geosynchronous satellite. However, because geosynchronous satellites are limited to a geosynchronous orbit (GSO), the number of satellites that may be placed in the GSO is limited. As alternatives to geosynchronous satellites, communication systems which utilize a constellation of satellites in non-geosynchronous orbits (NGSO), such as low-earth orbits (LEO), have been devised to provide communication coverage to the entire Earth or at least large parts of the Earth.

Compared to GSO satellite-based and terrestrial communication systems, non-geosynchronous satellite-based systems, such as LEO satellite-based systems, may present several challenges. For example, because LEO satellites move quickly across the sky relative to a given point on the earth's surface, beams transmitted from an LEO satellite may pass relatively quickly across a user terminal (UT). The process by which the UT transitions from a first beam to a second beam of the satellite may be referred to as "inter-beam handover." Each beam is typically managed by a respective media access controller (MAC) and/or scheduler within a network controller for the satellite.

In order to maximize throughput of a satellite communication system, communications between the NAC and the UT may implement a modulation and coding scheme (MCS) that is optimized for the channel conditions of the satellite beam being used for such communications Channel conditions for a given satellite beam tend to vary slowly over time (e.g., based on changing weather conditions, movements of the UT, movements of the satellite, etc.). However, beam switching (e.g., during inter-beam handovers) may cause significant changes to the channel conditions in a very short period of time. As a result, an MCS that is optimized for communications between the NAC and the UT prior to an inter-beam handover may be suboptimal for such communications immediately following the inter-beam handover. Thus, it may be desirable to dynamically adjust the MCS for communications between a NAC and a UT based on changing channel conditions associated with inter-beam handovers.

SUMMARY

Aspects of the disclosure are directed to apparatuses and methods for improving the quality and/or throughput of communications during inter-beam handovers in a satellite communication system. In one example, a method of operating a user terminal in a satellite communications system is disclosed. The method may include determining an occurrence of an inter-beam handover for switching communications with a controller of the satellite communication system from a first beam to a second beam, measuring a channel quality of the second beam based at least in part on the occurrence of the inter-beam handover, and sending the channel quality measurement to the controller via a reverse-link communication.

In another example, a user terminal is disclosed. The user terminal may include one or more processors and a memory configured to store instructions. Execution of the instructions by the one or more processors may cause the user terminal to determine an occurrence of an inter-beam handover for switching communications with a controller of a satellite communication system from a first beam to a second beam, measure a channel quality of the second beam based at least in part on the occurrence of the inter-beam handover, and send the channel quality measurement to the controller via a reverse-link communication.

In another example, a user terminal is disclosed. The user terminal may include means for determining an occurrence of an inter-beam handover for switching communications with a controller of a satellite communication system from a first beam to a second beam, means for measuring a channel quality of the second beam based at least in part on the occurrence of the inter-beam handover, and means for sending the channel quality measurement to the controller via a reverse-link communication.

In another example, a non-transitory computer-readable medium is disclosed. The non-transitory computer-readable medium may store instructions that, when executed by one or more processors of a user terminal, cause the user terminal to perform operations that may include determining an occurrence of an inter-beam handover for switching communications with a controller of a satellite communication system from a first beam to a second beam, measuring a channel quality of the second beam based at least in part on the occurrence of the inter-beam handover, and sending the channel quality measurement to the controller via a reverse-link communication.

BRIEF DESCRIPTION OF THE DRAWINGS

Aspects of this disclosure are illustrated by way of example and are not intended to be limited by the figures of the accompanying drawings.

DETAILED DESCRIPTION

Figure 1:
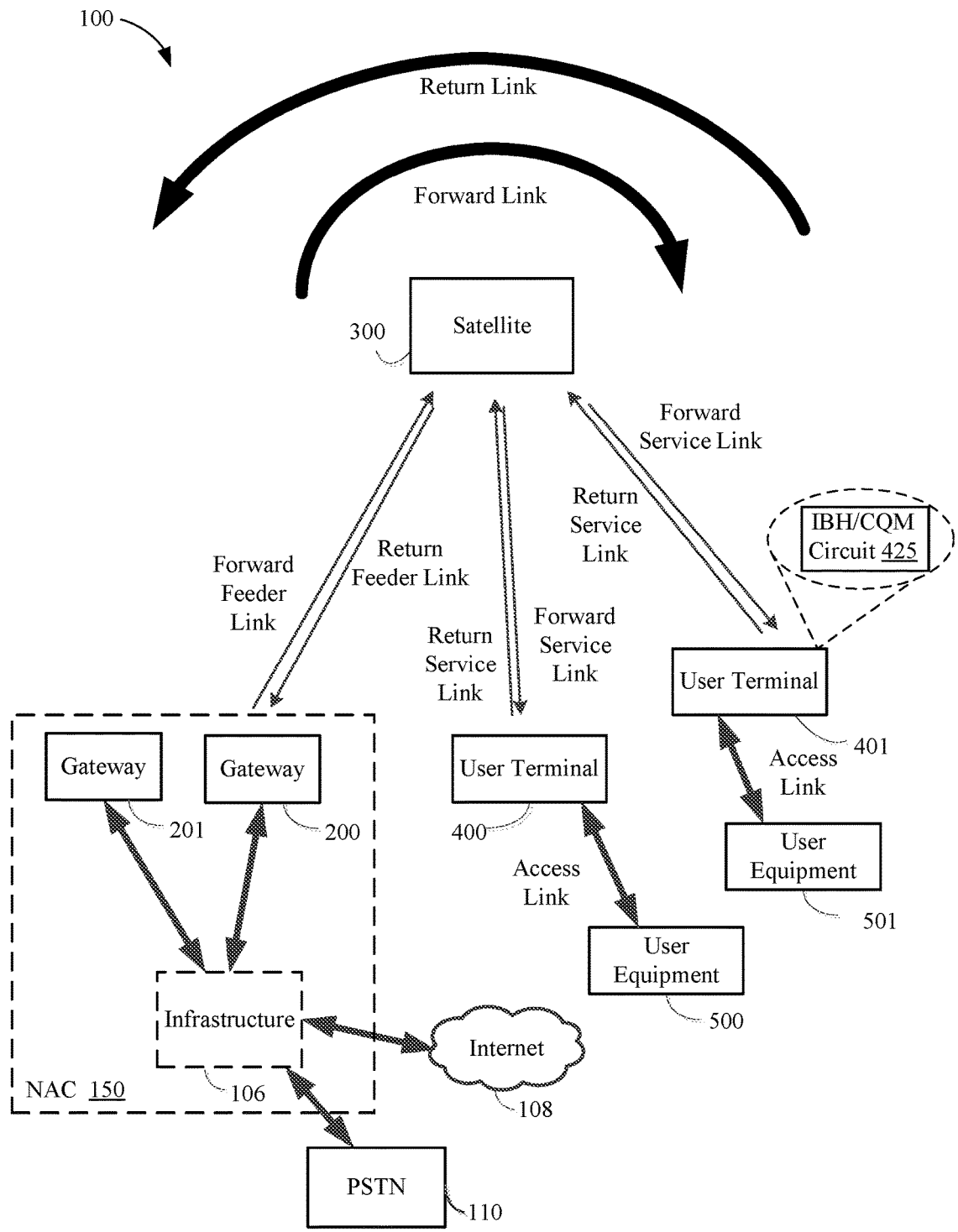
FIG. 1 shows a block diagram of an example communication system.

The example implementations described herein may allow a user terminal that communicates with a network controller via a satellite to switch transmissions from one beam (e.g., a source beam) of the satellite to another beam (e.g., a target beam) of the satellite while mitigating the effects of changing channel conditions. As described in more detail below, the user terminal may provide channel quality feedback for a target beam when switching from the source beam to the target beam, thereby improving the quality and throughput of communications on the target beam immediately after the inter-beam handover. In some aspects, a user terminal may measure the channel quality of the target beam based on an occurrence (e.g., instance) of an inter-beam handover for switching communications with a network controller from a first beam to a second beam of a satellite.

The user terminal may send the channel quality measurement to the network controller via a reverse-link communication. The network controller may then select a modulation and coding scheme (MCS) to be used for communications on the target beam, after the inter-beam handover is completed, based on the measured channel quality of the target beam.

Aspects of the disclosure are described in the following description and related drawings directed to specific examples. Alternate examples may be devised without departing from the scope of the disclosure. Additionally, well-known elements will not be described in detail or will be omitted so as not to obscure the relevant details of the disclosure.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage or mode of operation.

The terminology used herein is for the purpose of describing particular aspects only and is not intended to be limiting of the aspects. As used herein, the singular forms "a," "an" and "the" are intended to include the plural forms as well, unless the context clearly indicates otherwise. It will be further understood that the terms "comprises," "comprising," "includes" or "including," when used herein, specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to" or "in communication with" are not limited to direct connections unless expressly stated otherwise.

Further, many aspects are described in terms of sequences of actions to be performed by, for example, elements of a computing device. It will be recognized that various actions described herein can be performed by specific circuits, for example, central processing units (CPUs), graphic processing units (GPUs), digital signal processors (DSPs), application specific integrated circuits (ASICs), field programmable gate arrays (FPGAs), or various other types of general purpose or special purpose processors or circuits, by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

In the following description, numerous specific details are set forth such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the various aspects of the present disclosure. In other instances, well-known circuits and devices are shown in block diagram form to avoid obscuring the present disclosure. The various aspects of the present disclosure are not to be construed as limited to specific examples described herein but rather to include within their scopes all implementations defined by the appended claims.

FIG. 1 illustrates an example of a satellite communication system 100 which includes a plurality of satellites (although only one satellite 300 is shown for clarity of illustration) in non-geosynchronous orbits, for example, low-earth orbits (LEO), a network access controller (NAC) 150 in communication with the satellite 300, a plurality of user terminals (UTs) 400 and 401 in communication with the satellite 300, and a plurality of user equipment (UE) 500 and 501 in communication with the UTs 400 and 401, respectively. Each UE 500 or 501 may be a user device such as a mobile device, a telephone, a smartphone, a tablet, a laptop computer, a computer, a wearable device, a smart watch, an audiovisual device, or any device including the capability to communicate with a UT. Additionally, the UE 500 and/or UE 501 may be a device (e.g., access point, small cell, etc.) that is used to communicate to one or more end user devices. In the example illustrated in FIG. 1, the UT 400 and the UE 500 communicate with each other via a bidirectional access link (having a forward access link and return access link), and similarly, the UT 401 and the UE 501 communicate with each other via another bidirectional access link. In another implementation, one or more additional UE (not shown) may be configured to receive only and therefore communicate with a UT only using a forward access link. In another implementation, one or more additional UE (not shown) may also communicate with UT 400 or UT 401. Alternatively, a UT and a corresponding UE may be integral parts of a single physical device, such as a mobile telephone with an integral satellite transceiver and an antenna for communicating directly with a satellite, for example.

The UT 400 may include an inter-beam handover and channel quality measurement (IBH/CQM) circuit 425 that may allow the UT 400 to determine an occurrence of an inter-beam handover for switching communications between UT 400 from a first beam to a second beam of a satellite (e.g., satellite 300). In example implementations, the IBH/CQM circuit 425 may further enable the UT 400 to measure a channel quality of the second beam based at least in part on the occurrence of the inter-beam handover. Thereafter, the UT 400 may send the channel quality measurement to a controller (e.g., NAC 150) via a reverse-link communication, for example, as described in more detail below with respect to FIGS. 7-16.

The NAC 150 may include gateways 200 and 201, infrastructure 106, and additional components (not shown for simplicity) for communicating with the satellite 300. The gateway 200 may have access to the Internet 108 or one or more other types of public, semiprivate or private networks. In the example illustrated in FIG. 1, the gateway 200 is in communication with infrastructure 106, which is capable of accessing the Internet 108 or one or more other types of public, semiprivate or private networks. The gateway 200 may also be coupled to various types of communication backhaul, including, for example, landline networks such as optical fiber networks or public switched telephone networks (PSTN) 110. Further, in alternative implementations, the gateway 200 may interface to the Internet 108, PSTN 110, or one or more other types of public, semiprivate or private networks without using infrastructure 106. Still further, gateway 200 may communicate with other gateways, such as gateway 201 through the infrastructure 106 or alternatively may be configured to communicate to gateway 201 without using infrastructure 106. Infrastructure 106 may include, in whole or part, a network control center (NCC), a satellite control center (SCC), a wired and/or wireless core network and/or any other components or systems used to facilitate operation of and/or communication with the satellite communication system 100.

Communications between the satellite 300 and the gateway 200 in both directions are called feeder links, whereas communications between the satellite and each of the UTs 400 and 401 in both directions are called service links. A signal path from the satellite 300 to a ground station, which may be the gateway 200 or one of the UTs 400 and 401, may be generically called a downlink. A signal path from a ground station to the satellite 300 may be generically called an uplink. Additionally, as illustrated, signals can have a general directionality such as a forward link and a return link or reverse link. Accordingly, a communication link in a direction originating from the gateway 200 and terminating at the UT 400 through the satellite 300 is called a forward link, whereas a communication link in a direction originating from the UT 400 and terminating at the gateway 200 through the satellite 300 is called a return link or reverse link. As such, the signal path from the gateway 200 to the satellite 300 is labeled "Forward Feeder Link" whereas the signal path from the satellite 300 to the gateway 200 is labeled "Return Feeder Link" in FIG. 1. In a similar manner, the signal path from each UT 400 or 401 to the satellite 300 is labeled "Return Service Link" whereas the signal path from the satellite 300 to each UT 400 or 401 is labeled "Forward Service Link" in FIG. 1.

Figure 2:
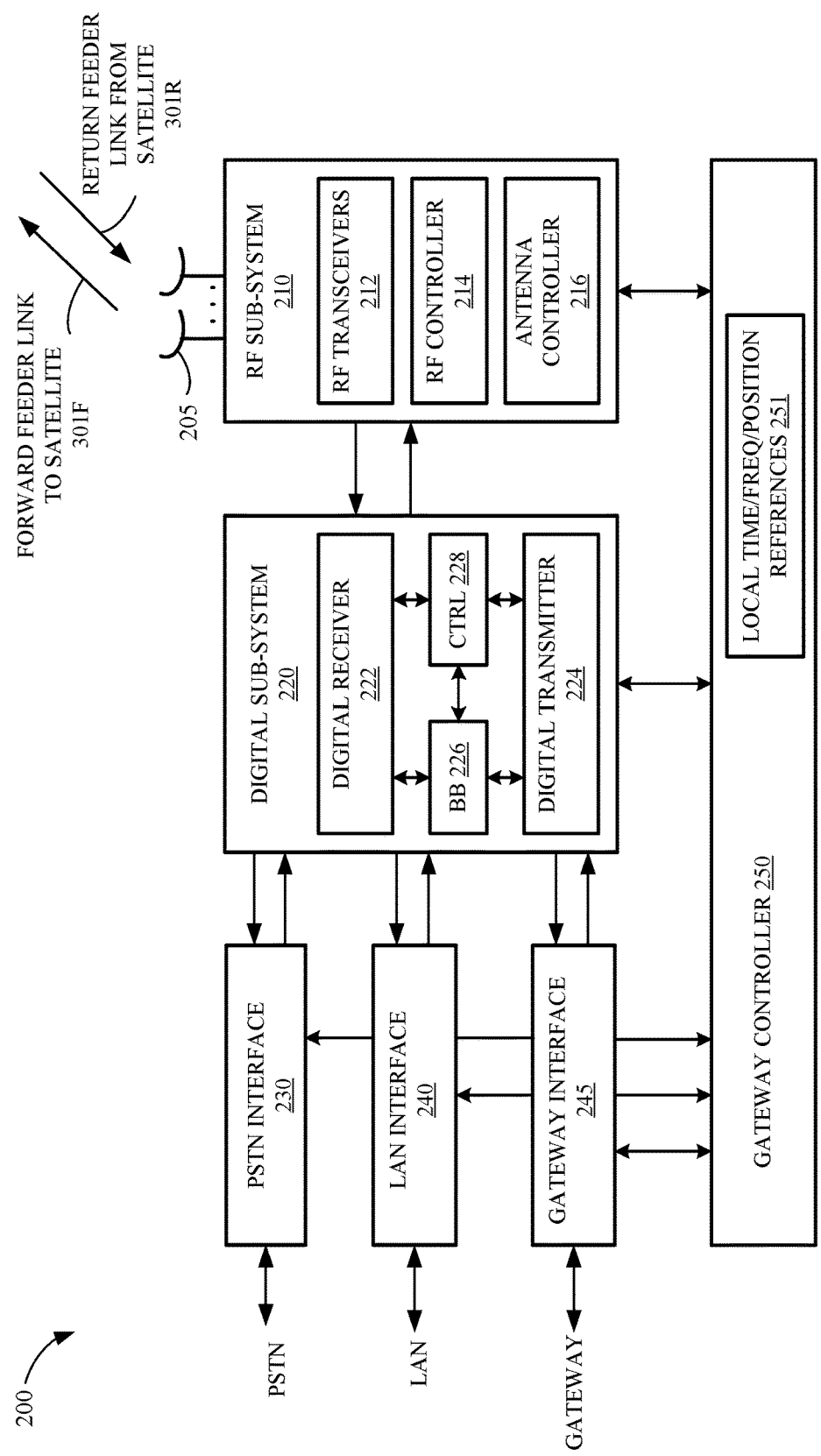
FIG. 2 shows a block diagram of one example of the gateway of FIG. 1.

FIG. 2 is an example block diagram of gateway 200, which also can apply to gateway 201 of FIG. 1. Gateway 200 is shown to include a number of antennas 205, an RF subsystem 210, a digital subsystem 220, a Public Switched Telephone Network (PSTN) interface 230, a Local Area Network (LAN) interface 240, a gateway interface 245, and a gateway controller 250. RF subsystem 210 is coupled to antennas 205 and to digital subsystem 220. Digital subsystem 220 is coupled to PSTN interface 230, to LAN interface 240, and to gateway interface 245. Gateway controller 250 is coupled to RF subsystem 210, digital subsystem 220, PSTN interface 230, LAN interface 240, and gateway interface 245.

RF subsystem 210, which may include a number of RF transceivers 212, an RF controller 214, and an antenna controller 216, may transmit communication signals to satellite 300 via a forward feeder link 301F, and may receive communication signals from satellite 300 via a return feeder link 301R. Although not shown for simplicity, each of the RF transceivers 212 may include a transmit chain and a receive chain. Each receive chain may include a low noise amplifier (LNA) and a down-converter (e.g., a mixer) to amplify and down-convert, respectively, received communication signals in a well-known manner. In addition, each receive chain may include an analog-to-digital converter (ADC) to convert the received communication signals from analog signals to digital signals (e.g., for processing by digital subsystem 220). Each transmit chain may include an up-converter (e.g., a mixer) and a power amplifier (PA) to up-convert and amplify, respectively, communication signals to be transmitted to satellite 300 in a well-known manner. In addition, each transmit chain may include a digital-to-analog converter (DAC) to convert the digital signals received from digital subsystem 220 to analog signals to be transmitted to satellite 300.

The RF controller 214 may be used to control various aspects of the number of RF transceivers 212 (e.g., selection of the carrier frequency, frequency and phase calibration, gain settings, and the like). The antenna controller 216 may control various aspects of the antennas 205 (e.g., beamforming, beam steering, gain settings, frequency tuning, and the like).

The digital subsystem 220 may include a number of digital receiver modules 222, a number of digital transmitter modules 224, a baseband (BB) processor 226, and a control (CTRL) processor 228. Digital subsystem 220 may process communication signals received from RF subsystem 210 and forward the processed communication signals to PSTN interface 230 and/or LAN interface 240, and may process communication signals received from PSTN interface 230 and/or LAN interface 240 and forward the processed communication signals to RF subsystem 210.

Each digital receiver module 222 may correspond to signal processing elements used to manage communications between gateway 200 and UT 400. One of the receive chains of RF transceivers 212 may provide input signals to multiple digital receiver modules 222. A number of digital receiver modules 222 may be used to accommodate all of the satellite beams and possible diversity mode signals being handled at any given time. Although not shown for simplicity, each digital receiver module 222 may include one or more digital data receivers, a searcher receiver, and a diversity combiner and decoder circuit. The searcher receiver may be used to search for appropriate diversity modes of carrier signals, and may be used to search for pilot signals (or other relatively fixed pattern strong signals).

The digital transmitter modules 224 may process signals to be transmitted to UT 400 via satellite 300. Although not shown for simplicity, each digital transmitter module 224 may include a transmit modulator that modulates data for transmission. The transmission power of each transmit modulator may be controlled by a corresponding digital transmit power controller (not shown for simplicity) that may (1) apply a minimum level of power for purposes of interference reduction and resource allocation and (2) apply appropriate levels of power when needed to compensate for attenuation in the transmission path and other path transfer characteristics.

The control processor 228, which is coupled to digital receiver modules 222, digital transmitter modules 224, and baseband processor 226, may provide command and control signals to effect functions such as, but not limited to, signal processing, timing signal generation, power control, handoff control, diversity combining, and system interfacing.

The control processor 228 may also control the generation and power of pilot, synchronization, and paging channel signals and their coupling to the transmit power controller (not shown for simplicity). The pilot channel is a signal that is not modulated by data, and may use a repetitive unchanging pattern or non-varying frame structure type (pattern) or tone type input. For example, the orthogonal function used to form the channel for the pilot signal generally has a constant value, such as all 1's or 0's, or a well-known repetitive pattern, such as a structured pattern of interspersed 1's and 0's.

Baseband processor 226 is well known in the art and is therefore not described in detail herein. For example, the baseband processor 226 may include a variety of known elements such as (but not limited to) coders, data modems, and digital data switching and storage components.

The PSTN interface 230 may provide communication signals to, and receive communication signals from, an external PSTN either directly or through additional infrastructure 106, as illustrated in FIG. 1. The PSTN interface 230 is well known in the art, and therefore is not described in detail herein. For other implementations, the PSTN interface 230 may be omitted, or may be replaced with any other suitable interface that connects gateway 200 to a ground-based network (e.g., the Internet).

The LAN interface 240 may provide communication signals to, and receive communication signals from, an external LAN. For example, LAN interface 240 may be coupled to the internet 108 either directly or through additional infrastructure 106, as illustrated in FIG. 1. The LAN interface 240 is well known in the art, and therefore is not described in detail herein.

The gateway interface 245 may provide communication signals to, and receive communication signals from, one or more other gateways associated with the satellite communication system 100 of FIG. 1 (and/or to/from gateways associated with other satellite communication systems, not shown for simplicity). For some implementations, gateway interface 245 may communicate with other gateways via one or more dedicated communication lines or channels (not shown for simplicity). For other implementations, gateway interface 245 may communicate with other gateways using PSTN 110 and/or other networks such as the Internet 108 (see also FIG. 1). For at least one implementation, gateway interface 245 may communicate with other gateways via infrastructure 106.

Overall gateway control may be provided by gateway controller 250. The gateway controller 250 may plan and control utilization of satellite 300's resources by gateway 200. For example, the gateway controller 250 may analyze trends, generate traffic plans, allocate satellite resources, monitor (or track) satellite positions, and monitor the performance of gateway 200 and/or satellite 300. The gateway controller 250 may also be coupled to a ground-based satellite controller (not shown for simplicity) that maintains and monitors orbits of satellite 300, relays satellite usage information to gateway 200, tracks the positions of satellite 300, and/or adjusts various channel settings of satellite 300.

For the example implementation illustrated in FIG. 2, the gateway controller 250 includes a local time, frequency, and position references 251, which may provide local time and frequency information to the RF subsystem 210, the digital subsystem 220, and/or the interfaces 230, 240, and 245. The time and frequency information may be used to synchronize the various components of gateway 200 with each other and/or with satellite(s) 300. The local time, frequency, and position references 251 may also provide position information (e.g., ephemeris data) of satellite(s) 300 to the various components of gateway 200. Further, although depicted in FIG. 2 as included within gateway controller 250, for other implementations, the local time, frequency, and position references 251 may be a separate subsystem that is coupled to gateway controller 250 (and/or to one or more of digital subsystem 220 and RF subsystem 210).

Although not shown in FIG. 2 for simplicity, the gateway controller 250 may also be coupled to a network control center (NCC) and/or a satellite control center (SCC). For example, the gateway controller 250 may allow the SCC to communicate directly with satellite(s) 300, for example, to retrieve ephemeris data from satellite(s) 300. The gateway controller 250 may also receive processed information (e.g., from the SCC and/or the NCC) that allows gateway controller 250 to properly aim its antennas 205 (e.g., at the appropriate satellite(s) 300), to schedule beam transmissions, to coordinate handovers, and to perform various other well-known functions.

Figure 3:
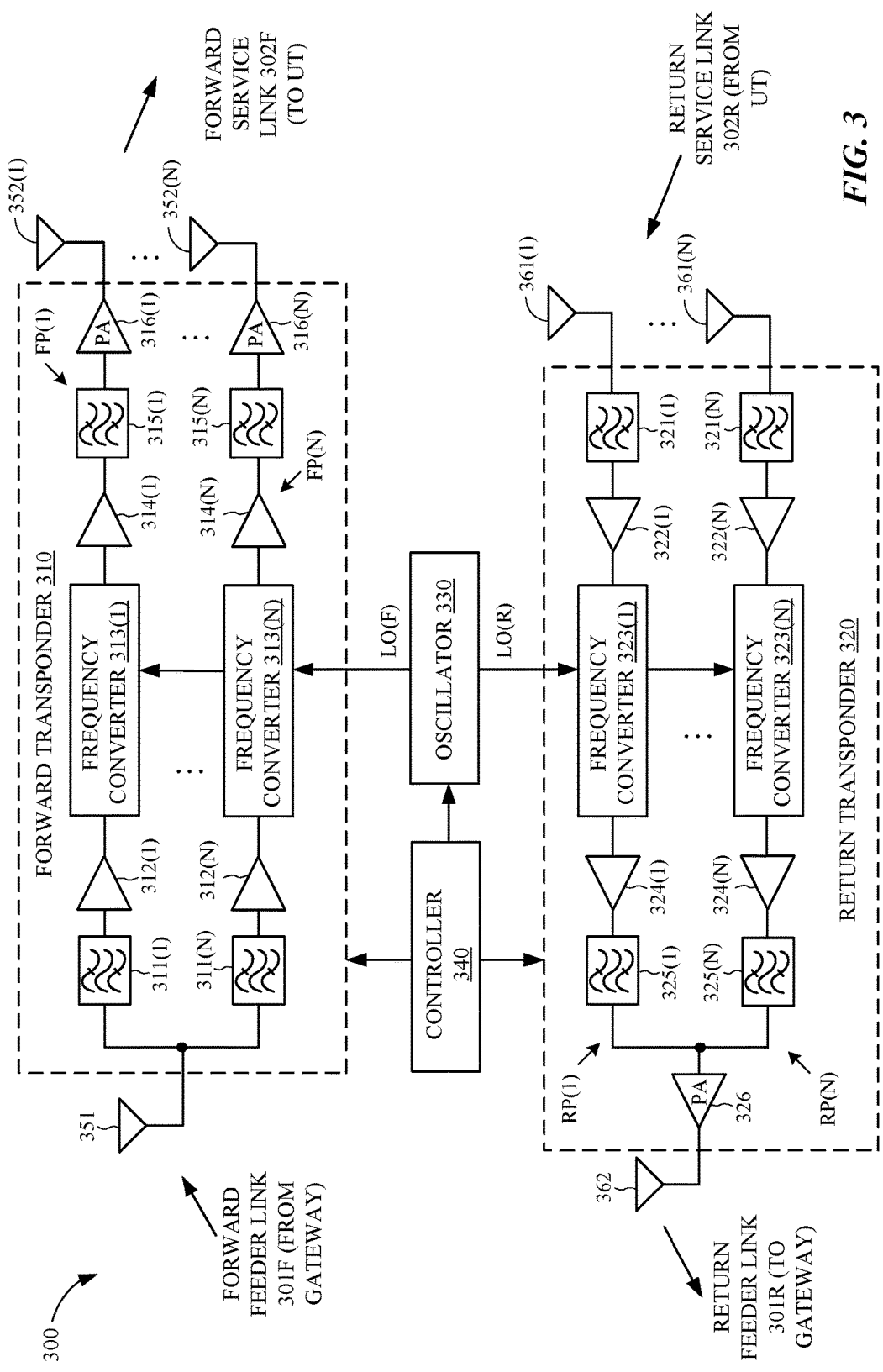
FIG. 3 shows a block diagram of one example of the satellite of FIG. 1.

FIG. 3 is an example block diagram of satellite 300 for illustrative purposes only. It will be appreciated that specific satellite configurations can vary significantly and may or may not include on-board processing. Further, although illustrated as a single satellite, two or more satellites using inter-satellite communication may provide the functional connection between the gateway 200 and UT 400. It will be appreciated that disclosure is not limited to any specific satellite configuration and any satellite or combinations of satellites that can provide the functional connection between the gateway 200 and UT 400 can be considered within the scope of the disclosure. In one example, satellite 300 is shown to include a forward transponder 310, a return transponder 320, an oscillator 330, a controller 340, forward link antennas 351-352, and return link antennas 361-362. The forward transponder 310, which may process communication signals within a corresponding channel or frequency band, may include a respective one of first bandpass filters 311(1)-311(N), a respective one of first LNAs 312(1)-312(N), a respective one of frequency converters 313(1)-313(N), a respective one of second LNAs 314(1)-314(N), a respective one of second bandpass filters 315(1)-315(N), and a respective one of PAs 316(1)-316(N). Each of the PAs 316(1)-316(N) is coupled to a respective one of antennas 352(1)-352(N), as shown in FIG. 3.

Within each of the respective forward paths FP(1)-FP(N), the first bandpass filter 311 passes signal components having frequencies within the channel or frequency band of the respective forward path FP, and filters signal components having frequencies outside the channel or frequency band of the respective forward path FP. Thus, the pass band of the first bandpass filter 311 corresponds to the width of the channel associated with the respective forward path FP. The first LNA 312 amplifies the received communication signals to a level suitable for processing by the frequency converter 313. The frequency converter 313 converts the frequency of the communication signals in the respective forward path FP (e.g., to a frequency suitable for transmission from satellite 300 to UT 400). The second LNA 314 amplifies the frequency-converted communication signals, and the second bandpass filter 315 filters signal components having frequencies outside of the associated channel width. The PA 316 amplifies the filtered signals to a power level suitable for transmission to UTs 400 via respective antenna 352. The return transponder 320, which includes a number N of return paths RP(1)-RP(N), receives communication signals from UT 400 along return service link 302R via antennas 361(1)-361(N), and transmits communication signals to gateway 200 along return feeder link 301R via one or more antennas 362. Each of the return paths RP(1)-RP(N), which may process communication signals within a corresponding channel or frequency band, may be coupled to a respective one of antennas 361(1)-361(N), and may include a respective one of first bandpass filters 321(1)-321(N), a respective one of first LNAs 322(1)-322(N), a respective one of frequency converters 323(1)-323(N), a respective one of second LNAs 324(1)-324(N), and a respective one of second bandpass filters 325(1)-325(N).

Within each of the respective return paths RP(1)-RP(N), the first bandpass filter 321 passes signal components having frequencies within the channel or frequency band of the respective return path RP, and filters signal components having frequencies outside the channel or frequency band of the respective return path RP. Thus, the pass band of the first bandpass filter 321 may for some implementations correspond to the width of the channel associated with the respective return path RP. The first LNA 322 amplifies all the received communication signals to a level suitable for processing by the frequency converter 323. The frequency converter 323 converts the frequency of the communication signals in the respective return path RP (e.g., to a frequency suitable for transmission from satellite 300 to gateway 200). The second LNA 324 amplifies the frequency-converted communication signals, and the second bandpass filter 325 filters signal components having frequencies outside of the associated channel width. Signals from the return paths RP(1)-RP(N) are combined and provided to the one or more antennas 362 via a PA 326. The PA 326 amplifies the combined signals for transmission to the gateway 200.

Oscillator 330, which may be any suitable circuit or device that generates an oscillating signal, provides a forward local oscillator signal LO(F) to the frequency converters 313(1)-313(N) of forward transponder 310, and provides a return local oscillator signal LO(R) to frequency converters 323(1)-323(N) of return transponder 320. For example, the LO(F) signal may be used by frequency converters 313(1)-313(N) to convert communication signals from a frequency band associated with the transmission of signals from gateway 200 to satellite 300 to a frequency band associated with the transmission of signals from satellite 300 to UT 400. The LO(R) signal may be used by frequency converters 323(1)-323(N) to convert communication signals from a frequency band associated with the transmission of signals from UT 400 to satellite 300 to a frequency band associated with the transmission of signals from satellite 300 to gateway 200.

Controller 340, which is coupled to forward transponder 310, return transponder 320, and oscillator 330, may control various operations of satellite 300 including (but not limited to) channel allocations. In one aspect, the controller 340 may include a memory coupled to a processor (not shown for simplicity). The memory may include a non-transitory computer-readable medium (e.g., one or more nonvolatile memory elements, such as EPROM, EEPROM, Flash memory, a hard drive, etc.) storing instructions that, when executed by the processor, cause the satellite 300 to perform operations including (but not limited to) those described herein with respect to FIGS. 12-15.

Figure 4:
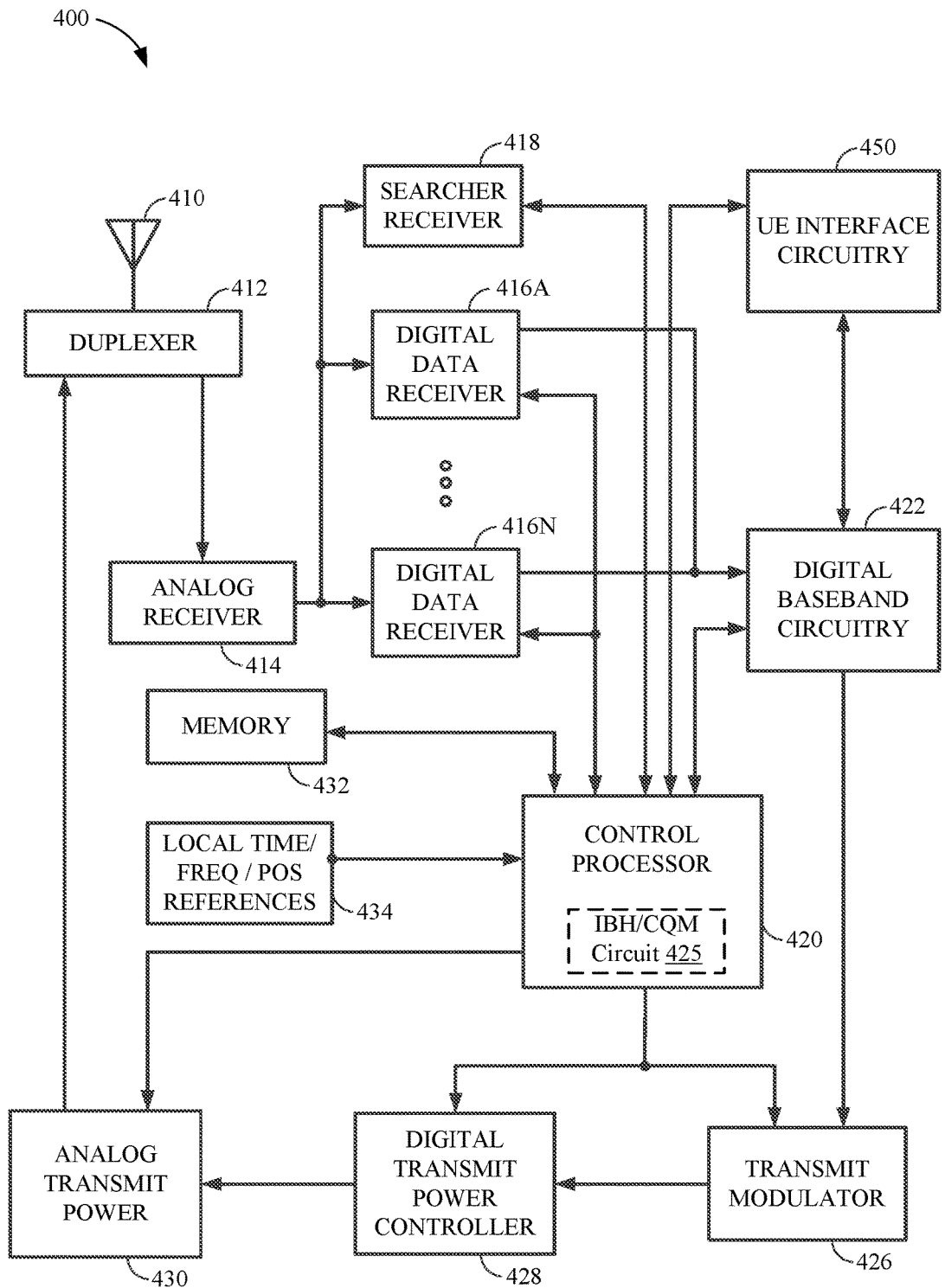
FIG. 4 shows a block diagram of one example of the user terminal (UT) of FIG. 1.

An example of a transceiver for use in the UT 400 or 401 is illustrated in FIG. 4. In FIG. 4, at least one antenna 410 is provided for receiving forward link communication signals (e.g., from satellite 300), which are transferred to an analog receiver 414, where they are down-converted, amplified, and digitized. A duplexer element 412 is often used to allow the same antenna to serve both transmit and receive functions. Alternatively, a UT transceiver may employ separate antennas for operating at different transmit and receive frequencies.

The digital communication signals output by the analog receiver 414 are transferred to at least one digital data receiver 416A and at least one searcher receiver 418. Additional digital data receivers to 416N can be used to obtain desired levels of signal diversity, depending on the acceptable level of transceiver complexity, as would be apparent to one skilled in the relevant art.

At least one user terminal control processor 420 is coupled to digital data receivers 416A-416N and searcher receiver 418. The control processor 420 provides, among other functions, basic signal processing, timing, power and handoff control or coordination, and selection of frequency used for signal carriers. Another basic control function that may be performed by the control processor 420 is the selection or manipulation of functions to be used for processing various signal waveforms. Signal processing by the control processor 420 can include a determination of relative signal strength and computation of various related signal parameters. Such computations of signal parameters, such as timing and frequency may include the use of additional or separate dedicated circuitry to provide increased efficiency or speed in measurements or improved allocation of control processing resources.

The UT 400 may include an inter-beam handover and channel quality measurement (IBH/CQM) circuit 425 that may allow the UT 400 to determine an occurrence of an inter-beam handover for switching communications between UT 400 from a first beam to a second beam of a satellite (e.g., satellite 300). In example implementations, the IBH/CQM circuit 425 may further enable the UT 400 to measure a channel quality of the second beam based at least in part on the occurrence of the inter-beam handover. Thereafter, the UT 400 may send the channel quality measurement to a controller (e.g., NAC 150) via a reverse-link communication, for example, as described in more detail below with respect to FIGS. 7-16.

The outputs of digital data receivers 416A-416N are coupled to digital baseband circuitry 422 within the user terminal. The digital baseband circuitry 422 comprises processing and presentation elements used to transfer information to and from UE 500 as shown in FIG. 1, for example. Referring to FIG. 4, if diversity signal processing is employed, the digital baseband circuitry 422 may comprise a diversity combiner and decoder. Some of these elements may also operate under the control of, or in communication with, a control processor 420.

When voice or other data is prepared as an output message or communications signal originating with the user terminal, the digital baseband circuitry 422 is used to receive, store, process, and otherwise prepare the desired data for transmission. The digital baseband circuitry 422 provides this data to a transmit modulator 426 operating under the control of the control processor 420. The output of the transmit modulator 426 is transferred to a power controller 428 which provides output power control to a transmit power amplifier 430 for final transmission of the output signal from the antenna 410 to a satellite (e.g., satellite 300).

In FIG. 4, the UT transceiver also includes a memory 432 associated with the control processor 420. The memory 432 may include instructions for execution by the control processor 420 as well as data for processing by the control processor 420.

In the example illustrated in FIG. 4, the UT 400 also includes an optional local time, frequency and/or position references 434 (e.g., a GPS receiver), which may provide local time, frequency and/or position information to the control processor 420 for various applications, including, for example, time and frequency synchronization for the UT 400.

Digital data receivers 416A-N and searcher receiver 418 are configured with signal correlation elements to demodulate and track specific signals. Searcher receiver 418 is used to search for pilot signals, or other relatively fixed pattern strong signals, while digital data receivers 416A-N are used to demodulate other signals associated with detected pilot signals. However, a digital data receiver 416 can be assigned to track the pilot signal after acquisition to accurately determine the ratio of signal chip energies to signal noise, and to formulate pilot signal strength. Therefore, the outputs of these units can be monitored to determine the energy in, or frequency of, the pilot signal or other signals. These receivers also employ frequency tracking elements that can be monitored to provide current frequency and timing information to control processor 420 for signals being demodulated.

The control processor 420 may use such information to determine to what extent the received signals are offset from the oscillator frequency, when scaled to the same frequency band, as appropriate. This and other information related to frequency errors and frequency shifts can be stored in a storage or memory element 432 as desired.

The control processor 420 may also be coupled to UE interface circuitry 450 to allow communications between UT 400 and one or more UEs. UE interface circuitry 450 may be configured as desired for communication with various UE configurations and accordingly may include various transceivers and related components depending on the various communication technologies employed to communicate with the various UEs supported. For example, UE interface circuitry 450 may include one or more antennas, a wide area network (WAN) transceiver, a wireless local area network (WLAN) transceiver, a Local Area Network (LAN) interface, a Public Switched Telephone Network (PSTN) interface and/or other known communication technologies configured to communicate with one or more UEs in communication with UT 400.

Figure 5:
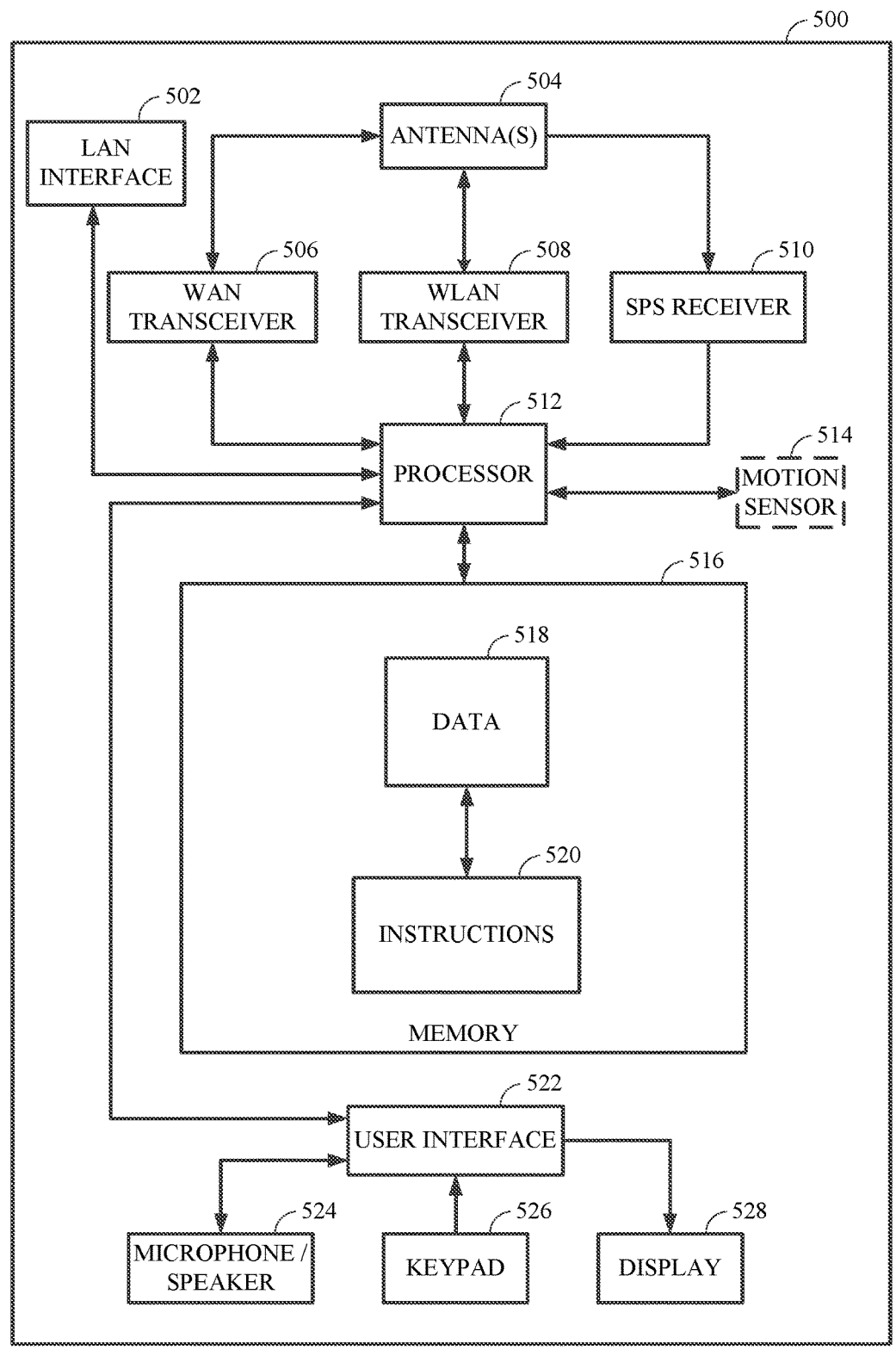
FIG. 5 shows a block diagram of one example of the user equipment (UE) of FIG. 1.

FIG. 5 is a block diagram illustrating an example of UE 500, which also can apply to UE 501 of FIG. 1. The UE 500 as shown in FIG. 5 may be a mobile device, a handheld computer, a tablet, a wearable device, a smart watch, or any type of device capable of interacting with a user, for example. Additionally, the UE may be a network side device that provides connectivity to various ultimate end user devices and/or to various public or private networks. In the example shown in FIG. 5, the UE 500 may comprise a LAN interface 502, one or more antennas 504, a wide area network (WAN) transceiver 506, a wireless local area network (WLAN) transceiver 508, and a satellite positioning system (SPS) receiver 510. The SPS receiver 510 may be compatible with the Global Positioning System (GPS), GLONASS and/or any other global or regional satellite based positioning system. In an alternate aspect, the UE 500 may include a WLAN transceiver 508, such as a Wi-Fi transceiver, with or without the LAN interface 502, WAN transceiver 506, and/or SPS receiver 510, for example. Further, UE 500 may include additional transceivers such as Bluetooth, ZigBee and other known technologies, with or without the LAN interface 502, WAN transceiver 506, WLAN transceiver 508 and/or SPS receiver 510. Accordingly, the elements illustrated for UE 500 are provided merely as an example configuration and are not intended to limit the configuration of UEs in accordance with the various aspects disclosed herein.

In the example shown in FIG. 5, a processor 512 is connected to the LAN interface 502, the WAN transceiver 506, the WLAN transceiver 508 and the SPS receiver 510. Optionally, a motion sensor 514 and other sensors may also be coupled to the processor 512.

A memory 516 is connected to the processor 512. In one aspect, the memory 516 may include data 518 which may be transmitted to and/or received from the UT 400, as shown in FIG. 1. Referring to FIG. 5, the memory 516 may also include stored instructions 520 to be executed by the processor 512 to perform the process steps for communicating with the UT 400, for example. Furthermore, the UE 500 may also include a user interface 522, which may include hardware and software for interfacing inputs or outputs of the processor 512 with the user through light, sound or tactile inputs or outputs, for example. In the example shown in FIG. 5, the UE 500 includes a microphone/speaker 524, a keypad 526, and a display 528 connected to the user interface 522. Alternatively, the user's tactile input or output may be integrated with the display 528 by using a touch-screen display, for example. Once again, the elements illustrated in FIG. 5 are not intended to limit the configuration of the UEs disclosed herein and it will be appreciated that the elements included in the UE 500 will vary based on the end use of the device and the design choices of the system engineers.

Additionally, the UE 500 may be a user device such as a mobile device or external network side device in communication with but separate from the UT 400 as illustrated in FIG. 1, for example. Alternatively, the UE 500 and the UT 400 may be integral parts of a single physical device.

As mentioned above, GSO satellites are deployed in geostationary orbits at approximately 35,000 km above the Earth's surface, and revolve around the Earth in an equatorial orbit at the Earth's own angular velocity. In contrast, NGSO satellites are deployed in non-geostationary orbits and revolve around the Earth above various paths of the Earth's surface at relatively low altitudes (e.g., as compared with GSO satellites).

Figure 6:
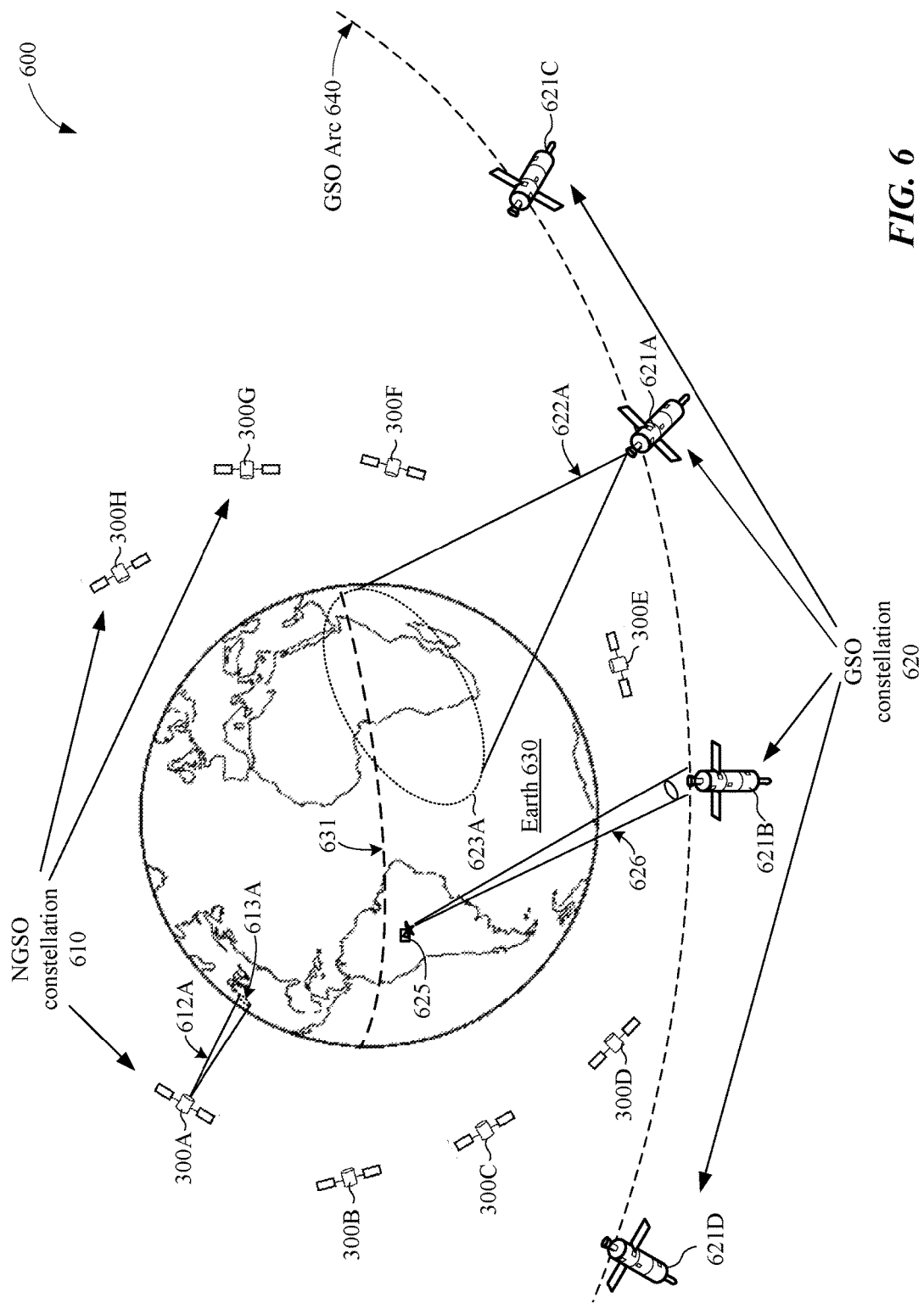
FIG. 6 shows a diagram depicting an NGSO satellite constellation and a GSO satellite constellation orbiting the earth.

For example, FIG. 6 shows a diagram 600 depicting a first constellation 610 of NGSO satellites 300A-300H and a second constellation 620 of GSO satellites 621A-621D in orbit around Earth 630. Although depicted in FIG. 6 as including only eight NGSO satellites 300A-300H, the first constellation 610 may include any suitable number of NGSO satellites, for example, to provide world-wide satellite coverage. For some implementations, the first constellation 610 may include between 600 and 900 NGSO satellites. Similarly, although depicted in FIG. 6 as including only four GSO satellites 621A-621D, the second constellation 620 may include any suitable number of GSO satellites, for example, to provide world-wide satellite coverage. In addition, although not shown in FIG. 6 for simplicity, one or more other constellations of GSO satellites and/or one or more other constellations of NGSO satellites may be in orbit above Earth 630.

The first constellation 610, which may hereinafter be referred to as the NGSO satellite constellation 610, may provide a first satellite service to most, if not all, areas on Earth 630. The second constellation 620, which may hereinafter be referred to as the GSO satellite constellation 620, may provide a second satellite service to large portions of Earth 630. The first satellite service may be different than the second satellite service. For some aspects, the first satellite service provided by the NGSO satellite constellation 610 may correspond to a global broadband Internet service, and the second satellite service provided by the GSO satellite constellation 620 may correspond to a satellite-based broadcast (e.g., television) service. Further, for at least some implementations, each of NGSO satellites 300A-300H may be one example of satellite 300 of FIGS. 1 and 3.

The NGSO satellites 300A-300H may orbit the Earth 630 in any suitable number of non-geosynchronous orbital planes (not shown for simplicity), and each of the orbital planes may include a plurality of NGSO satellites (e.g., such as one or more of the NGSO satellites 300A-300H). The non-geosynchronous orbital planes may include, for example, polar orbital patterns and/or Walker orbital patterns. Thus, to a stationary observer on Earth 630, the NGSO satellites 300A-300H appear to move quickly across the sky in a plurality of different paths across the Earth's surface, with each of the NGSO satellites 300A-300H providing coverage for a corresponding path across the earth's surface.

In contrast, the GSO satellites 621A-621D may be in a geosynchronous orbit around Earth 630 and thus, to a stationary observer on Earth 630, may appear motionless in a fixed position in the sky located above the Earth's equator 631. Each of the GSO satellites 621A-621D maintains a relatively fixed line-of-sight with a corresponding GSO ground station on Earth 630. For example, GSO satellite 621B is depicted in FIG. 6 as maintaining a relatively fixed line-of-sight with a GSO ground station 625. It is noted that for a given point on the surface of Earth 630, there may be an arc of positions in the sky along which the GSO satellites 621A-621D may be located. This arc of GSO satellite positions may be referred to herein as the GSO arc 640. The receiving area for a GSO ground station (e.g., such as GSO ground station 625) may be defined by an antenna pattern of typically fixed orientation and fixed beam width (such as a beam width defined by an ITU specification). For example, the GSO ground station 625 is depicted as transmitting a beam 626 towards GSO satellite 621B.

In some aspects, each of the NGSO satellites 300A-300H may include a number of directional antennas to provide high-speed forward links (e.g., downlinks) with user terminals such as UT 400 of FIG. 1 and/or with gateways such as gateway 200 of FIG. 1. A high-gain directional antenna achieves higher data rates and is less susceptible to interference than an omni-directional antenna by focusing radiation into a relatively narrow beam width (as compared to the relatively wide beam width associated with an omni-directional antenna). For example, as depicted in FIG. 6, the coverage area 613A provided by a beam 612A transmitted from NGSO satellite 300A is relatively small compared to the coverage area 623A provided by a beam 622A transmitted from GSO satellite 621A.

Because the NGSO satellites 300A-300H revolve around the earth 630 relatively quickly (e.g., approximately every 90 minutes for low-earth-orbit (LEO) satellites), their positions change quickly relative to a fixed location on earth 630. To provide coverage over a wide area of the earth's surface (e.g., to provide Internet services across the United States), each of the NGSO satellites 300A-300H may provide coverage for a corresponding path across the earth's surface. For example, the NGSO satellites 300A-300H may each transmit any number of beams, and one or more of the beams may be directed towards overlapping regions on the earth's surface. As used herein, the footprint of a satellite is the surface area (on Earth) within which all UTs can communicate with the satellite (above a minimum elevation angle). The area covered by a beam transmitted from (e.g., a corresponding antenna of) the satellite is referred to herein as the beam coverage area. Thus, the footprint of a satellite may be defined by a number of beam coverage areas provided by a number of beams transmitted from the satellite.

Figure 7:
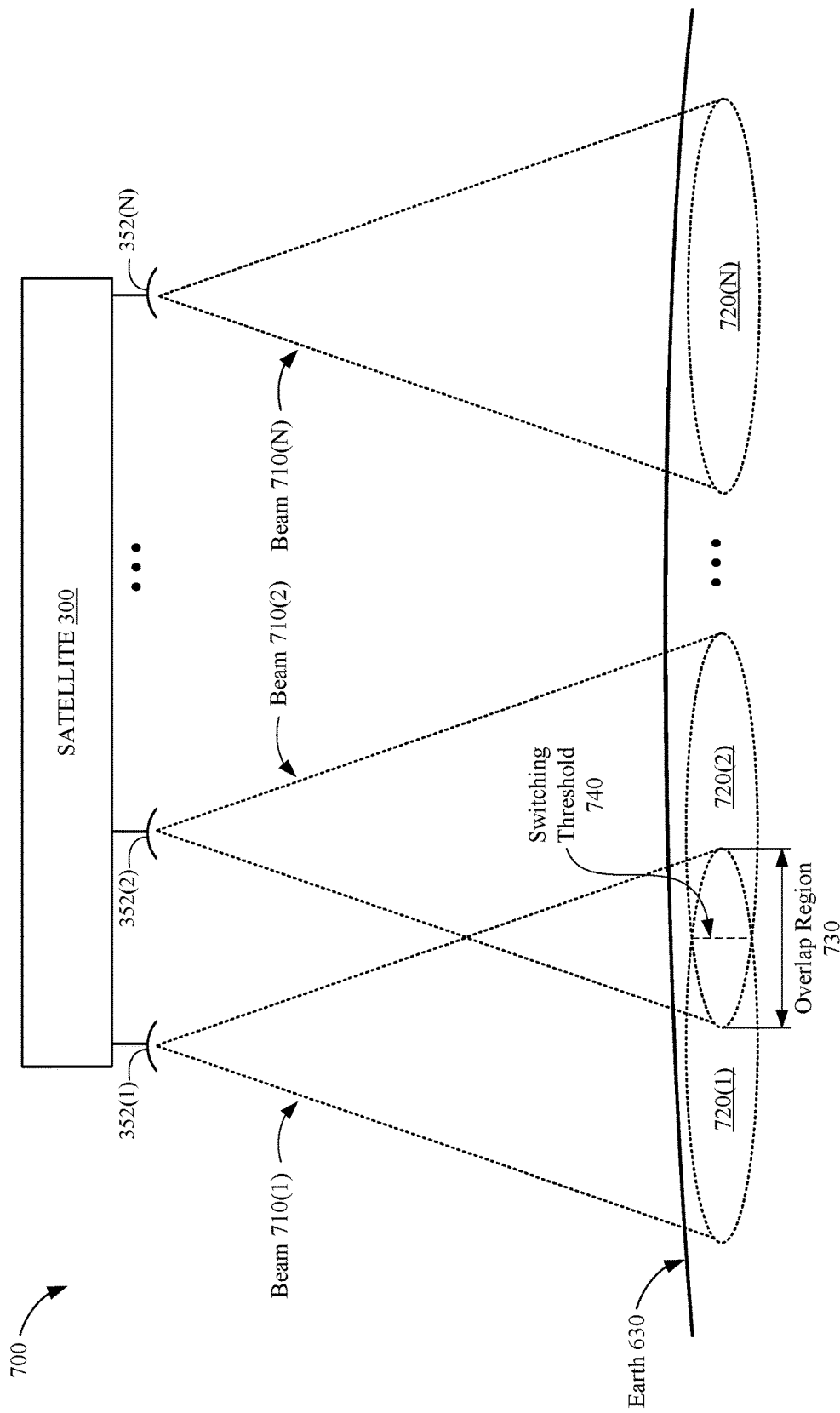
FIG. 7 depicts an NGSO satellite transmitting a number of beams onto the surface of the Earth.

FIG. 7 shows a diagram 700 depicting satellite 300 transmitting a number (N) of beams 710(1)-710(N) from a respective number (N) of antennas 352(1)-352(N). Referring also to FIG. 3, each of the antennas 352(1)-352(N) may be coupled to a corresponding forward path (FP) in the forward transponder 310 of satellite 300. Each of the beams 710(1)-710(N) may be used to transmit data from satellite 300 to one or more user terminals (e.g., UT 400 of FIG. 4) that are located within the beam's coverage area on Earth. Thus, in some aspects, the beams 710(1)-710(N) may represent the forward service link between satellite 300 and a number of UTs 400. For the example diagram 700 of FIG. 7, the beams 710(1)-710(N) are depicted as providing coverage areas 720(1)-720(N), respectively, on Earth 630. Together, the coverage areas 720(1)-720(N) provided by respective beams 710(1)-710(N) may define the footprint of satellite 300.

Each of the coverage areas 720(1)-720(N) may extend across an entire width of the satellite's footprint. In some implementations, the coverage areas 720(1)-720(N) may be of other suitable shapes, sizes, and/or orientations. Further, for at least some implementations, all satellites 300 in the NGSO satellite constellation 610 may have substantially similar footprints. Each of the beams 710(1)-710(N) operates as a respective communications channel of the satellite 300. As the satellite 300 passes over a user terminal on the surface of the earth 630, the channel quality of a given beam (e.g., as measured by the user terminal) may deteriorate, whereas the channel quality of a different beam may improve. Thus, it may be necessary to periodically switch the communications channel for the user terminal from one beam to another. This process may be referred to herein as "inter-beam handover."

Adjacent pairs of the coverage areas 720(1)-720(N) may touch and/or overlap each other, for example, so that the footprint provided by the beams 710(1)-710(N) may have minimal coverage gaps. In the example of FIG. 7, the intersection of beams 710(1) and 710(2) form an overlap region 730. Based on the movements of the satellite 300, a user terminal lying exclusively within coverage area 720(1) (e.g., and outside the overlap region 730) at a first time may eventually fall within the overlap region 730 at a second time. When the user terminal is within the overlap region 730, it may be able to communicate with satellite 300 using beam 710(1) or beam 710(2). At a certain point in the satellite's orbit, the channel quality of beam 710(2) will exceed the channel quality of beam 710(1), thus prompting an inter-beam handover from the current beam 710(1) (e.g., the "source beam") to the new beam 710(2) (e.g., the "target beam"). For example, the inter-beam handover may be triggered when the user terminal crosses a switching threshold 740 (e.g., such that the user terminal is subsequently more prominently positioned within the coverage area 720 (2) of the target beam 710(2) than the coverage area 720(1) of the source beam 710(1)). In some aspects, the source beam 710(1) and the target beam 710(2) may be provided by different satellites (not shown for simplicity).

The satellite 300 may be controlled by a network controller (e.g., NAC 150 of FIG. 1) on the surface of the earth 630. More specifically, each beam 710(1)-710(N) may be managed and/or controlled by a respective scheduler within, or otherwise associated with, the network controller. During an inter-beam handover, the scheduler for the source beam hands off communications with the user terminal to the scheduler for the target beam. The network controller and the user terminal may perform this operation synchronously, for example, based on a timeline specified in a beam transition table. Because the channel quality of the target beam 710(2) may be substantially different than the channel quality of the source beam 710(1) at the time of the inter-beam handover, a particular modulation and coding scheme (MCS) that is optimized for communications on the source beam 710(1) may be suboptimal for communicating on the target beam 710(2). For example, if the network controller uses a particular MCS for forward-link communications with a user terminal before performing an inter-beam handover, and channel conditions for the target beam 710(2) are different than channel condition for the source beam 710(1), the throughput and/or data rate of the forward-link communications may drop significantly if the network controller continues to use the same MCS after the inter-beam handover is completed.

The example implementations recognize that in order to avoid a significant drop in communications quality (e.g., throughput and/or data rate) after an inter-beam handover, it may be desirable to select a new MCS upon handing over communications from the source beam 710(1) to the target beam 710(2). In some aspects, the network controller may select the new MCS based on channel quality feedback from the user terminal. For example, the user terminal may measure the channel quality of the target beam 710(2) (e.g., based on reference signals or pilot signals broadcast on the target beam 710(2)) and provide information regarding the channel quality of the target beam 710(2) to the network terminal via a reverse-link communication (e.g., a channel quality feedback message). The channel quality information may be based on a signal-to-noise ratio (SNR), signal-to-interference plus noise ratio (SINR), signal-to-noise plus distortion ratio (SDNR), and/or any other metric that may be used to describe or otherwise indicate the quality of the communications channel (e.g., target beam 710(2)). Upon receiving the channel quality information from the user terminal, the network controller may select a particular MCS that is optimized for communications on the target beam 710(2) based on the determined quality of the channel.

To minimize or avoid any loss of throughput and/or data rate in communications on the target beam 710(2), the new MCS should be available soon after completing the inter-beam handover (e.g., within a threshold period). However, the example implementations recognize that satellite communications typically experience lengthy propagation delays (e.g., due to distances signals must travel between the surface of the earth 630 and the satellite 300). As a result, there may be a fixed delay between the time at which the user terminal begins measuring the channel quality of the target beam 710(2) and the time at which the network controller has completed selection of a new MCS. Thus, in example implementations, the timing of the channel quality measurement performed by the user terminal may be based at least in part on the occurrence (e.g., timing) of an inter-beam handover. For example, as described in greater detail below, the measuring of the channel quality (e.g., of the target beam 710(2)) may be triggered based on a beam switching schedule specified in a beam transition table and/or in response to a trigger signal received from the network controller.

In some aspects, the user terminal may measure the channel quality of the target beam 710(2) prior to initiating the inter-beam handover. For example, the user terminal may measure the channel quality of the target beam 710(2) while residing in the overlap region 730 and maintaining an active communications link on the source beam 710(1). More specifically, the user terminal may listen for pilot signals on the target beam 710(2) (e.g., with which to measure the channel quality of the target beam 710(2)) while remaining communicatively coupled to the network controller via the source beam 710(1). Furthermore, the user terminal may provide the channel quality measurement to the network controller (e.g., via the source beam 710(1)) before the inter-beam handover, which may enable the network controller to select a new MCS (e.g., based on the channel quality measurement) before or during the inter-beam handover. As a result, the new MCS may be used for communicating between the network controller and the user terminal upon switching communications over to the target beam 710(2).

In other aspects, the user terminal may measure the channel quality of the target beam 710(2) after completing the inter-beam handover. For example, the user terminal may measure the channel quality of the target beam 710(2) immediately (e.g., within a threshold period) after completing the inter-beam handover. In this manner, the user terminal may measure the channel quality of the target beam 710(2) without having to switch back to the source beam 710(1). Accordingly, the user terminal is not at risk of ignoring any forward-link communications that may potentially be transmitted by the network controller while the user terminal is measuring the channel quality of the target beam 710(2). The user terminal may provide the channel quality measurement to the network controller within a threshold duration of switching over to the target beam 710(2), which may enable the network controller to select a new MCS (e.g., based on the channel quality measurement) before initiating forward-link communications with the network controller on the target beam 710(2).

In some implementations, the MCS selection may be performed, at least in part, by satellite 300. Thus, although the operations for selecting an MCS based on channel quality feedback are described herein with respect to the network controller, in other aspects, at least a portion of such operations may be performed by satellite 300 (e.g., in lieu of, or in combination with, the network controller).

Figure 8A:
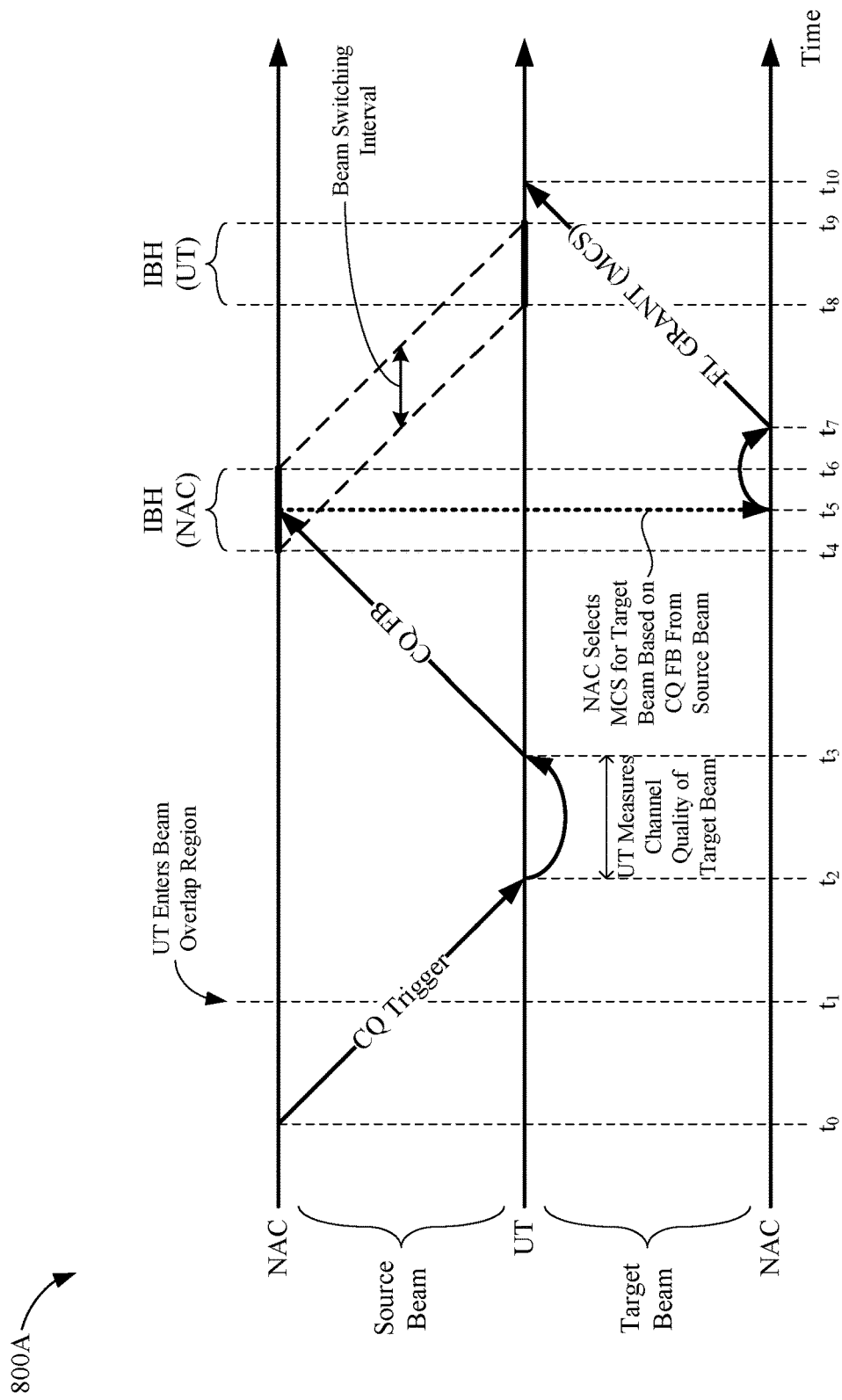
FIG. 8A shows an example timing diagram depicting an operation for providing channel quality feedback for a target beam prior to initiating an inter-beam handover, in accordance with example implementations.

FIG. 8A shows an example timing diagram 800A depicting an operation for providing channel quality feedback for a target beam prior to initiating an inter-beam handover, in accordance with example implementations. For purposes of discussion herein, the network controller (NAC) may correspond to NAC 150 of FIG. 1, and the user terminal (UT) may correspond to UT 400 of FIG. 4. Furthermore, with reference to FIG. 7, the source beam and target beam may correspond to beams 710(1) and 710(2), respectively, of satellite 300.

The UT initially operates on the source beam (e.g., at time $t_0$). For example, at this time, the UT may reside exclusively within the coverage area 720(1) of the source beam 710(1). At time $t_0$, the NAC transmits a channel quality (CQ) trigger signal to the UT via the source beam 710(1). Due to propagation delays in the satellite communications system, the UT receives the CQ trigger signal some time later (e.g., at time $t_2$). At this time, the UT may reside within a beam overlap region in which the source beam overlaps with the target beam. For example, at time $t_1$, the UT may enter the overlap region 730 of coverage areas 720(1) and 720(2).

The UT responds to the CQ trigger by measuring the channel quality of the target beam, from times $t_2$ to $t_3$. For example, the UT may tune one or more of its transceivers to the target beam to listen for pilot signals broadcast by the NAC. The UT may then determine the channel quality of the target beam based on the detected pilot signals (e.g., as described above with respect to FIG. 7). In some aspects, the UT may perform the channel quality measurement on the target beam while maintaining an active communications link with the NAC via the source beam. Then, at time $t_3$, the UT returns a CQ feedback (FB) message to the NAC, via the source beam. The CQ feedback message may include channel quality information indicating the measured channel quality of the target beam.

Meanwhile, from times $t_4$ to $t_6$, the NAC may perform an inter-beam handover (IBH) to hand off communications with the UT from the source beam to the target beam. For example, at time $t_4$, the UT may have crossed the switching threshold 740, at which point the channel quality of beam 710(2) may be superior to the channel quality of beam 710(1) (e.g., as perceived by the UT). The UT also performs the inter-beam handover, in conjunction with the NAC. However, due to the long communication distances between the NAC and the UT (e.g., and associated propagation delays), the UT performs the inter-beam handover from times $t_8$ to $t_9$ (e.g., which corresponds with the inter-beam handover by the NAC from times $t_4$ to $t_6$). For example, in this manner, if the NAC were to transmit a forward-link communication to the UT just before initiating its inter-beam handover (e.g., at time $t_4$), the UT would receive the forward-link communication just before initiating its own inter-beam handover (e.g., at time $t_8$).

While the inter-beam handover is being performed (e.g., from times $t_4$ to $t_6$ on the NAC and from times $t_8$ to $t_9$ on the UT), no communications may be initiated by either the NAC or the UT. This time period may be referred to herein as a "beam switching interval," and is denoted by the dashed lines connecting the respective IBH boundaries for the NAC and the UT. In the example of FIG. 8A, the UT transmits the CQ feedback message on the source beam prior to the beam switching interval. However, due to propagation delays, the CQ feedback message does not arrive at the NAC (e.g., via the source beam) until time $t_5$, after the inter-beam handover has been initiated (e.g., at time $t_4$). For example, with reference to FIG. 7, any reverse-link communications received by the satellite 300 may be forwarded or relayed to the NAC, regardless of the coverage area 720(1)-720(N) in which the UT when initiating such communications.

From times $t_5$ to $t_7$, the NAC may determine an MCS to be used for communicating with the UT on the target beam based on the received CQ feedback message. For example, the NAC may select the optimal MCS (e.g., that provides the highest throughput and/or data rate of communications with the UT) given the channel quality of the target beam. In some aspects, the NAC may determine or identify the beam (e.g., source beam or target beam) associated with the received CQ feedback message. For example, because the CQ feedback message includes channel quality information for the target beam, but is communicated via the source beam, the NAC may need to differentiate the channel quality information for the target beam from other channel quality information that may be received for the source beam (e.g., which, in some instances, may also be communicated via the source beam).

In some implementations, the CQ feedback message may indicate that the channel quality information included therein is for the target beam. In other implementations, the NAC may determine that the CQ feedback message is associated with the target beam based at least in part on a relative timing of the inter-beam handover and/or transmission of the CQ trigger signal. For example, the NAC may associate the received channel quality information with the target beam if, by the time it selects a new MCS based on the received channel quality information, the inter-beam handover will have been completed. Alternatively, and/or in addition, the NAC may associate the channel quality information with the target beam if it receives the CQ feedback message within a threshold period of transmitting the CQ trigger signal to the UT.

After the inter-beam handover is completed on the NAC, at time $t_7$, the NAC may send a forward-link (FL) grant message to the UT using the newly-selected MCS. As described above, due to propagation delays, the FL grant message transmitted by the NAC immediately after the inter-beam handover performed by the NAC (e.g., at time $t_7$) arrives at the UT immediately after the inter-beam handover performed by the UT (e.g., at time $t_{10}$). The FL grant message enables the UT to begin receiving forward-link communications on the target beam. In some aspects, the FL grant message may specify or otherwise indicate the MCS to be used for forward-link and/or reverse-link communications on the target beam. Accordingly, any subsequent communications on the target beam may be transmitted in accordance with the newly-selected MCS.

In some aspects, it may be desirable to time the initiation of the channel quality feedback operation to maximize the usage of the new MCS on the target beam. For example, due to processing times needed by the UT to measure the channel quality of the target beam (e.g., from times $t_2$ to $t_3$), for the NAC to determine the MCS to be used on the target beam (e.g., from times $t_5$ to $t_7$), and/or other delays, the NAC may determine the optimal time to transmit the CQ trigger signal such that a new MCS will have been selected for the target beam by the time the inter-beam handover is completed (e.g., at time $t_7$). More specifically, there may be a fixed delay (e.g., from times $t_2$ to $t_7$) associated with the process of selecting the MCS for the target beam. The timing of the CQ trigger signal transmission may account for this fixed delay in order to minimize the delay between completion of the inter-beam handover and selection of a new MCS.

Figure 8B:
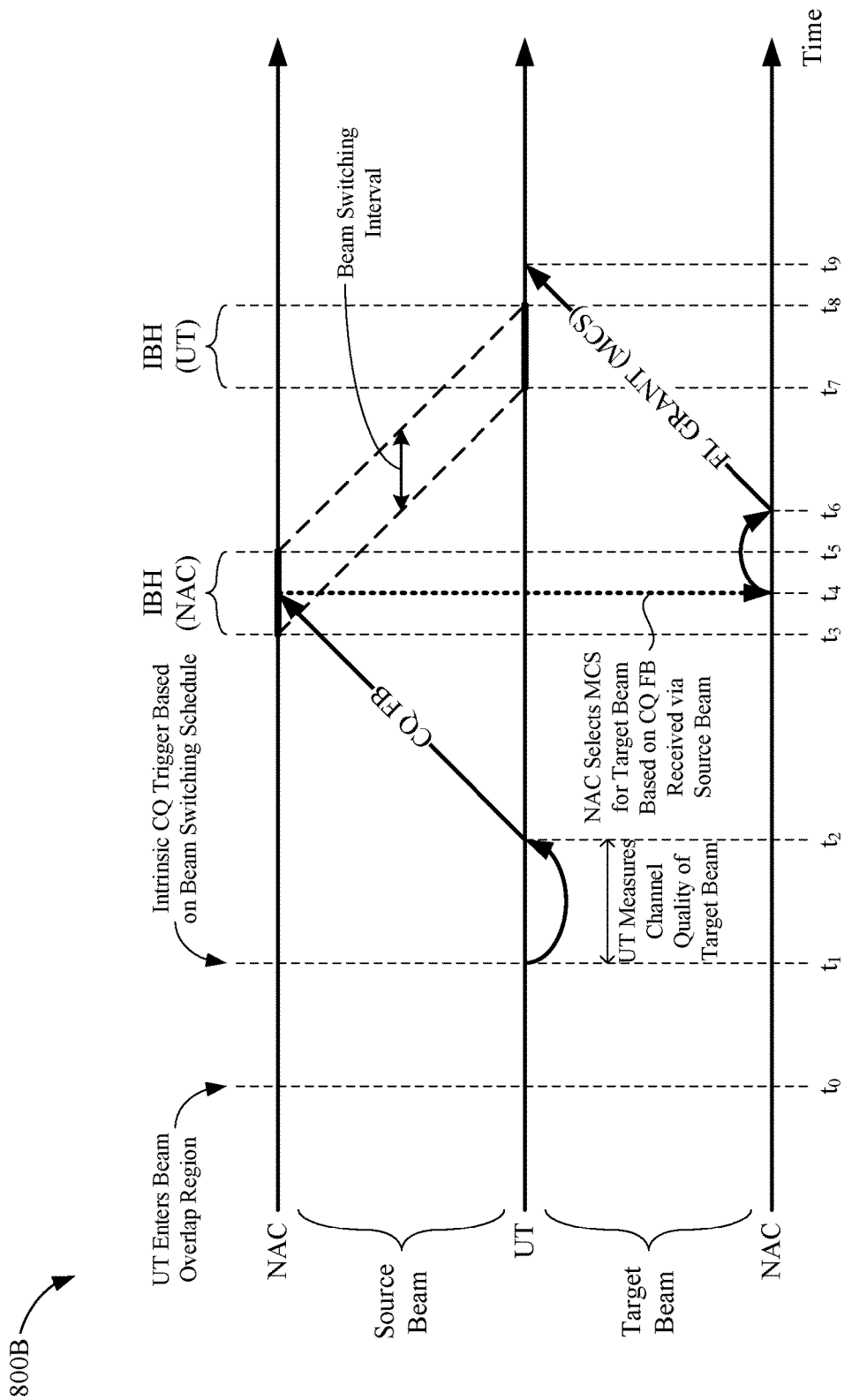
FIG. 8B shows an example timing diagram depicting an operation for providing channel quality feedback for a target beam prior to initiating an inter-beam handover, in accordance with other implementations.

FIG. 8B shows an example timing diagram 800B depicting an operation for providing channel quality feedback for a target beam prior to initiating an inter-beam handover, in accordance with other implementations. As described above with respect to FIG. 8A, the NAC may correspond to NAC 150 of FIG. 1, and the UT may correspond to UT 400 of FIG. 4. Furthermore, the source beam and target beam may correspond to beams 710(1) and 710(2), respectively, of satellite 300.

The UT initially operates on the source beam and, at time $t_0$, enters a beam overlap region in which the source beam overlaps with the target beam. At time $t_1$, the UT begins measuring the channel quality of the target beam. For example, the UT may perform the channel quality measurement in response to an "intrinsic" CQ trigger. In some aspects, the intrinsic CQ trigger may be based on a beam switching schedule provided in a beam transition table. The UT may perform the channel quality measurement, from times $t_1$ to $t_2$, while maintaining an active communications link with the NAC via the source beam. For example, the UT may temporarily tune one or more of its transceivers to the target beam to listen for pilot signals, and may then determine the channel quality of the target beam based on the detected pilot signals. Then, at time $t_2$, the UT returns a CQ feedback (FB) message to the NAC, via the source beam. The CQ feedback message may include channel quality information indicating the measured channel quality of the target beam.

Meanwhile, from times $t_3$ to $t_5$, the NAC may perform an inter-beam handover (IBH) to hand off communications with the UT from the source beam to the target beam. The UT also performs the inter-beam handover, in conjunction with the NAC, from times $t_7$ to $t_8$. In the example of FIG. 8B, the UT transmits the CQ feedback message on the source beam prior to the beam switching interval. However, due to propagation delays, the CQ feedback message may not arrive at the NAC (e.g., via the source beam) until time $t_4$, after the inter-beam handover has been initiated (e.g., at time $t_3$).

From times $t_4$ to $t_6$, the NAC may determine an MCS to be used for communicating with the UT on the target beam based on the received CQ feedback message. For example, the NAC may select the optimal MCS (e.g., that provides the highest throughput and/or data rate of communications with the UT) given the channel quality of the target beam. In some aspects, the NAC may determine or identify the beam (e.g., source beam or target beam) associated with the received CQ feedback message. For example, the CQ feedback message may indicate that the channel quality information included therein is for the target beam. Alternatively, or in addition, the NAC may determine that the CQ feedback message is associated with the target beam based at least in part on a relative timing of the inter-beam handover.

After the inter-beam handover is completed on the NAC, the NAC may send a forward-link (FL) grant message to the UT, at time $t_6$, using the newly-selected MCS. As described above, due to propagation delays, the FL grant message transmitted by the NAC arrives at the UT at time $t_9$ (e.g., after the UT has completed its inter-beam handover). The FL grant message enables the UT to begin receiving forward-link communications on the target beam. In some aspects, the FL grant message may specify or otherwise indicate the MCS to be used for forward-link and/or reverse-link communications on the target beam. Accordingly, any subsequent communications on the target beam may be transmitted in accordance with the newly-selected MCS.

In some aspects, it may be desirable to time the initiation of the channel quality feedback operation to maximize the usage of the new MCS on the target beam. For example, as described above with respect to FIG. 8A, there may be a fixed delay (e.g., from times $t_1$ to $t_6$) associated with the process of selecting the MCS for the target beam. The timing of the intrinsic CQ trigger may account for this fixed delay in order to minimize the delay between completion of the inter-beam handover and selection of a new MCS.

Figure 9A:
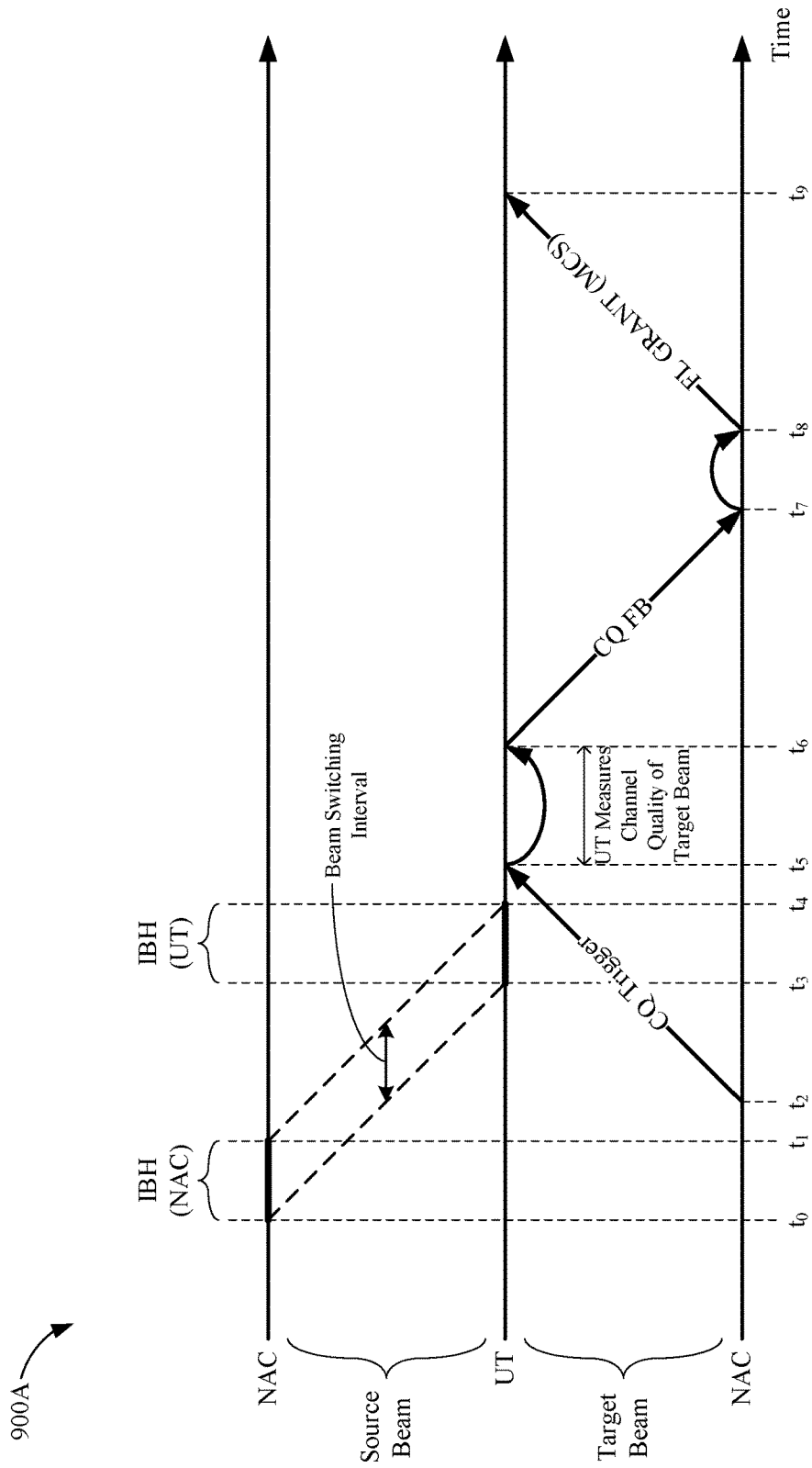
FIG. 9A shows an example timing diagram depicting an operation for providing channel quality feedback within a threshold period of completing an inter-beam handover, in accordance with example implementations.

FIG. 9A shows an example timing diagram 900A depicting an operation for providing channel quality feedback within a threshold period of completing an inter-beam handover, in accordance with example implementations. For purposes of discussion herein, the network controller (NAC) may correspond to NAC 150 of FIG. 1, and the user terminal (UT) may correspond to UT 400 of FIG. 4. Furthermore, with reference to FIG. 7, the source beam and target beam may correspond to beams 710(1) and 710(2), respectively, of satellite 300.

The UT initially operates on the source beam (e.g., at time $t_0$). The NAC performs an inter-beam handover (IBH), from times $t_0$ to $t_1$, to hand off communications with the UT from the source beam to the target beam. At time $t_2$, the NAC has effectively switched over to the target beam, and sends a channel quality (CQ) trigger signal to the UT via the target beam. Then, from times $t_3$ to $t_4$, the UT also performs the inter-beam handover (e.g., in conjunction with the NAC). Due to propagation delays, the CQ trigger signal may not arrive at the UT (e.g., on the source beam) until time $t_5$, after the inter-beam handover has been completed. At this time, the UT has also switched over to the target beam and is no longer in communications with the NAC via the source beam.

The UT responds to the CQ trigger by measuring the channel quality of the target beam, from times $t_5$ to $t_6$. For example, the UT may listen for pilot signals broadcast on the target beam, and determine the channel quality of the target beam based on the detected pilot signals (e.g., as described above with respect to FIG. 7). Since the UT is already operating on the target beam, it may not need to retune its transceivers (e.g., to a different beam) to measure the channel quality of the target beam. Then, at time $t_6$, the UT returns a CQ feedback (FB) message to the NAC, via the target beam. The CQ feedback message may include channel quality information indicating the measured channel quality of the target beam.

The NAC receives the CQ feedback message, via the target beam, at time $t_7$. Then, from times $t_7$ to $t_8$, the NAC may determine an MCS to be used for communicating with the UT on the target beam based on the received CQ feedback message. For example, the NAC may select the optimal MCS given the channel quality of the target beam. The NAC may then send a forward-link (FL) grant message to the UT, at time $t_8$, using the newly-selected MCS. The UT subsequently receives the FL grant message at time $t_9$. The FL grant message enables the UT to begin receiving forward-link communications on the target beam. In some aspects, the FL grant message may specify or otherwise indicate the MCS to be used for forward-link and/or reverse-link communications on the target beam. Accordingly, any subsequent communications on the target beam may be transmitted in accordance with the new MCS.

In some aspects, it may be desirable to time the initiation of the channel quality feedback operation to maximize the usage of the new MCS on the target beam. For example, as described above with respect to FIG. 8A, there may be a fixed delay (e.g., from times $t_5$ to $t_8$) associated with the process of selecting the MCS for the target beam. The timing of the CQ trigger may account for this fixed delay in order to minimize the delay between completion of the inter-beam handover and selection of a new MCS.

Figure 9B:
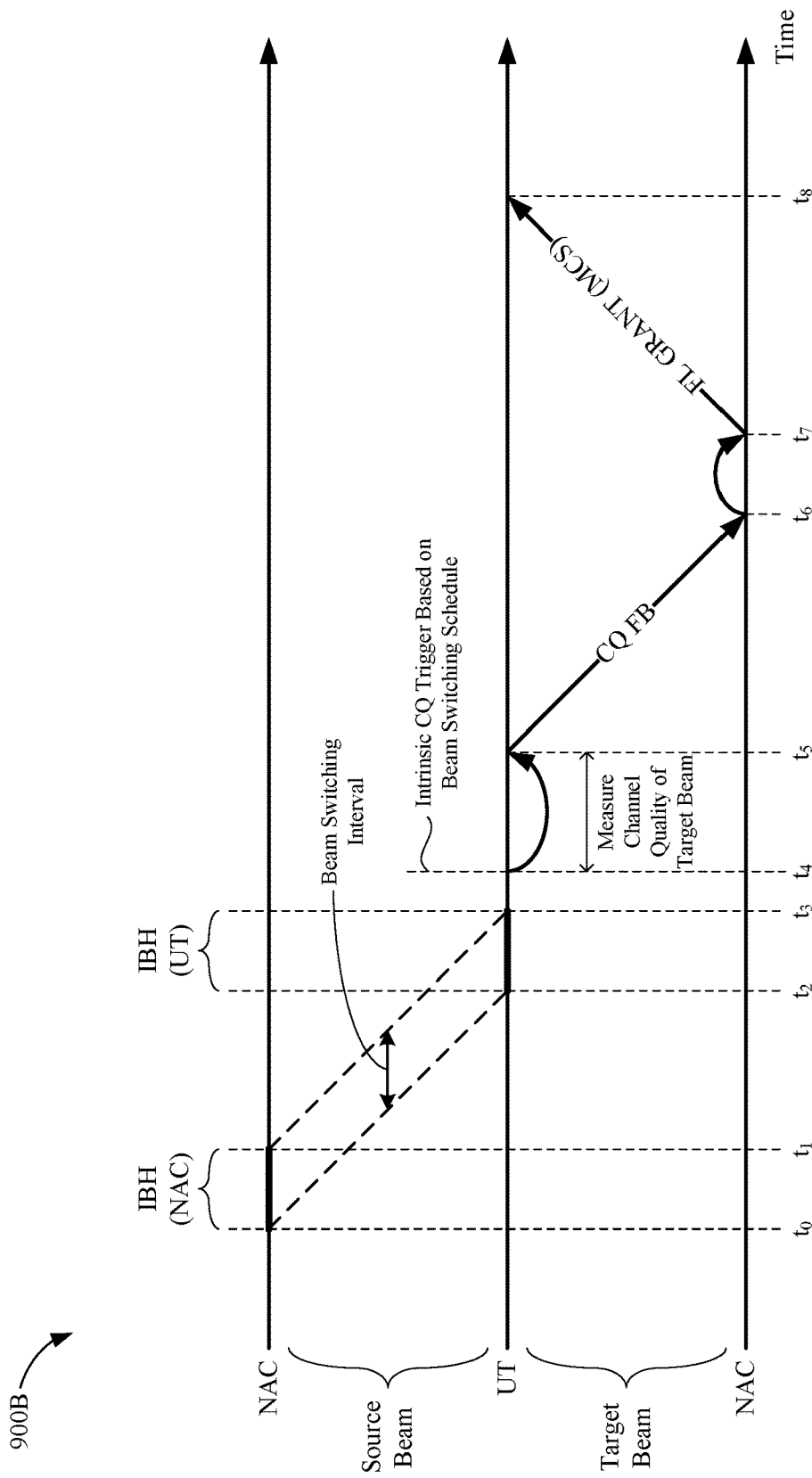
FIG. 9B shows an example timing diagram depicting an operation for providing channel quality feedback within a threshold period of completing an inter-beam handover, in accordance with other implementations.

FIG. 9B shows an example timing diagram 900B depicting an operation for providing channel quality feedback within a threshold period of completing an inter-beam handover, in accordance with other implementations. As described above with respect to FIG. 9A, the NAC may correspond to NAC 150 of FIG. 1, and the UT may correspond to UT 400 of FIG. 4. Furthermore, the source beam and target beam may correspond to beams 710(1) and 710(2), respectively, of satellite 300.

The UT initially operates on the source beam (e.g., at time $t_0$). The NAC performs an inter-beam handover (IBH), from times $t_0$ to $t_1$, to hand off communications with the UT from the source beam to the target beam. The UT also performs the inter-beam handover, in conjunction with the NAC, from times $t_2$ to $t_3$. At time $t_4$, the UT begins measuring the channel quality of the target beam. For example, the UT may perform the channel quality measurement in response to an intrinsic CQ trigger (e.g., based on a beam switching schedule provided in a beam transition table). Because the UT has already switched over to the target beam at this point (e.g., at time $t_4$), it does not need to retune its transceivers (e.g., to a different beam) in order to measure the channel quality of the target beam. Then, at time $t_5$, the UT returns a CQ feedback (FB) message to the NAC, via the target beam. The CQ feedback message may include channel quality information indicating the measured channel quality of the target beam.

The NAC receives the CQ feedback message, via the target beam, at time $t_6$. Then, from times $t_6$ to $t_7$, the NAC may determine an MCS to be used for communicating with the UT on the target beam based on the received CQ feedback message. For example, the NAC may select the optimal MCS given the channel quality of the target beam. The NAC may then send a forward-link (FL) grant message to the UT, at time $t_7$, using the newly-selected MCS. The UT subsequently receives the FL grant message at time $t_8$. The FL grant message enables the UT to begin receiving forward-link communications on the target beam. In some aspects, the FL grant message may specify or otherwise indicate the MCS to be used for forward-link and/or reverse-link communications on the target beam. Accordingly, nay subsequent communications on the target beam may be transmitted in accordance with the new MCS.

In some aspects, it may be desirable to time the initiation of the channel quality feedback operation to maximize the usage of the new MCS on the target beam. For example, as described above with respect to FIG. 8A, there may be a fixed delay (e.g., from times $t_4$ to $t_7$) associated with the process of selecting the MCS for the target beam. The timing of the intrinsic CQ trigger may account for this fixed delay in order to minimize the delay between completion of the inter-beam handover and selection of a new MCS.

In some implementations, the delay between completion of the inter-beam handover and selection of a new MCS may be further reduced by enabling the UT to measure the channel quality of the target beam while concurrently performing the inter-beam handover. More specifically, the timing of the intrinsic CQ trigger may be configured so that the UT may be ready to send the CQ feedback message to the NAC immediately (e.g., within a threshold duration) upon completing the inter-beam handover.

Figure 9C:
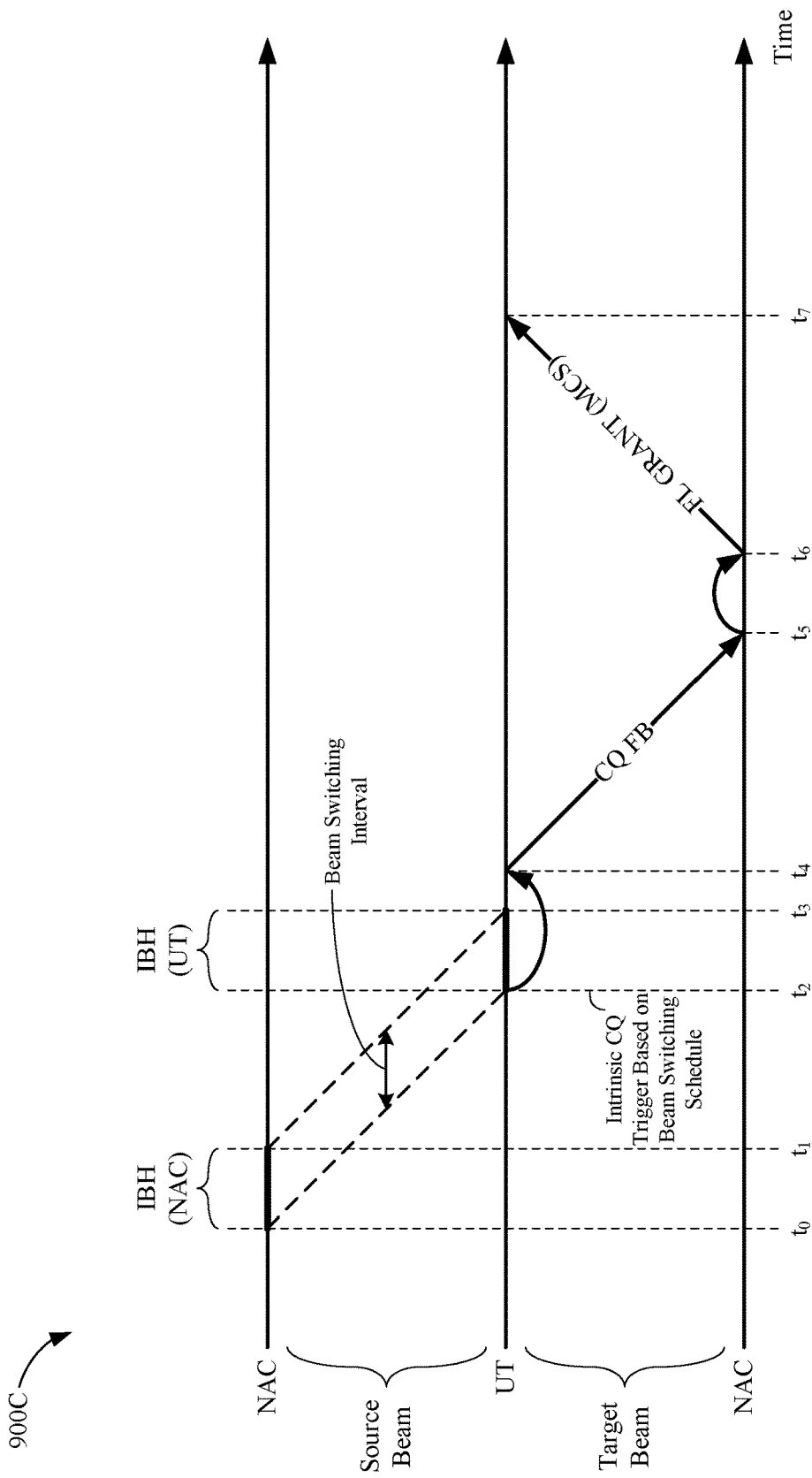
FIG. 9C shows an example timing diagram depicting an alternative implementation of the operation depicted in FIG. 9B.

For example, with reference to the example timing diagram 900C of FIG. 9C, the UT may begin measuring the channel quality of the target beam in response to an intrinsic CQ trigger at time $t_2$. The timing of the intrinsic CQ trigger may be determined based on a processing time (e.g., from times $t_2$ to $t_4$) for the UT to measure the channel quality of the target beam and an expected completion time (e.g., time $t_3$) of the inter-beam handover. As a result, the UT may measure the channel quality of the target beam (e.g., from times $t_2$ to $t_4$) while concurrently performing the inter-beam handover (e.g., from times $t_2$ to $t_3$). Thus, in some aspects, the UT may have finished measuring the channel quality of the target beam by the time the inter-beam handover is completed. This allows the UT to send a CQ feedback message (e.g., including the channel quality measurement for the target beam) to the NAC, at time $t_4$, upon completing the inter-beam handover.

Figure 10:
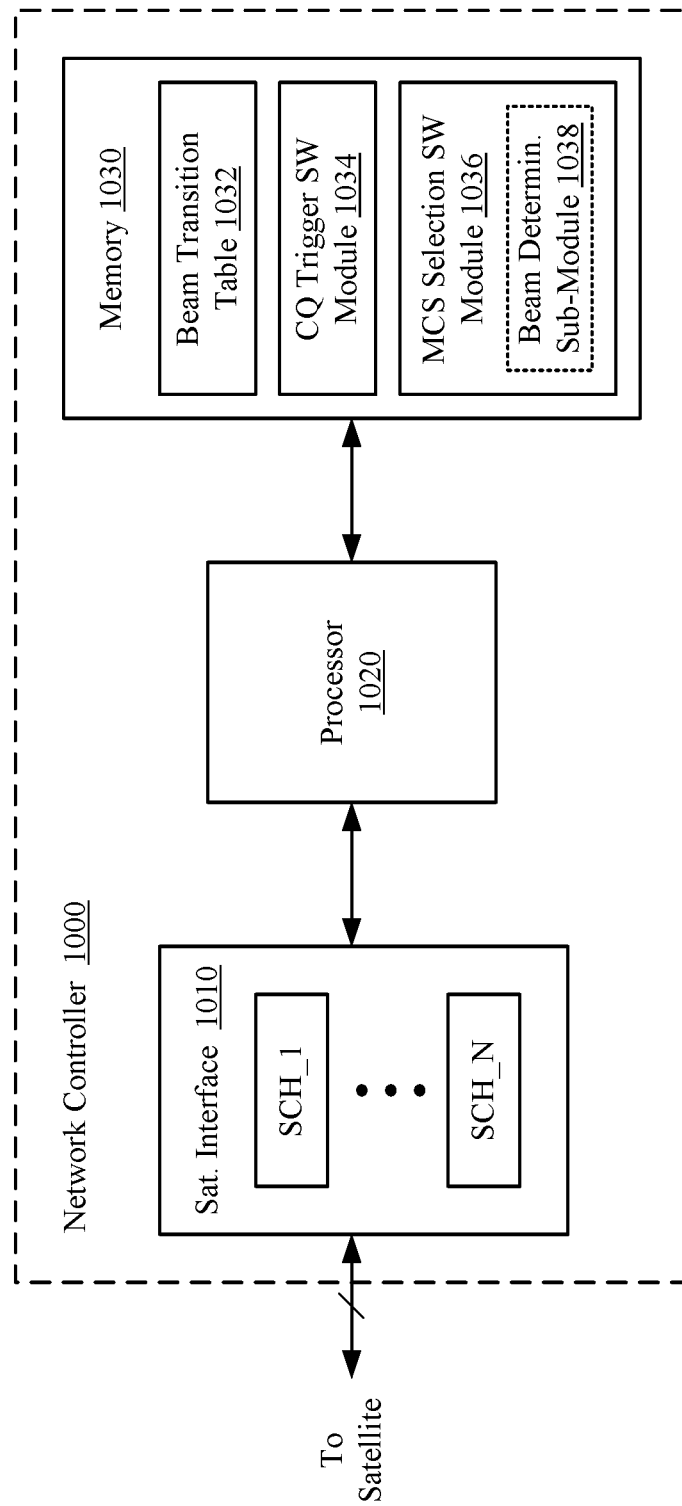
FIG. 10 shows a block diagram of an example network controller in accordance with example implementations.

FIG. 10 is a block diagram of an example network controller 1000 in accordance with example implementations. For purposes of discussion herein, the network controller 1000 may be an example of (or implemented within) the NAC 150 of FIG. 1. The network controller 1000 includes a satellite interface 1010, a processor 1020, and a memory 1030. The satellite interface 1010 may be configured to communicate with a particular satellite (e.g., satellite 300 of FIG. 1). Furthermore, the satellite interface 1010 may include a number of schedulers SCH_1-SCH_N that control the communications for respective beams of the satellite (e.g., as described above with respect to FIG. 7). For some implementations, the network controller 1000 may include other circuitry and/or components in addition to those shown in FIG. 10.

Memory 1030 includes a beam transition table 1032 for storing beam switching information. The beam switching information may include, for example, a timeline indicating when inter-beam handovers are to occur with individual user terminals and/or any information needed to perform an inter-beam handover with a particular user terminal. In some aspects, the beam switching information stored in the beam transition table 1032 may match or coincide with corresponding beam switching information stored on a user terminal (not shown) in communication with the network controller 1000.

Figure 15:
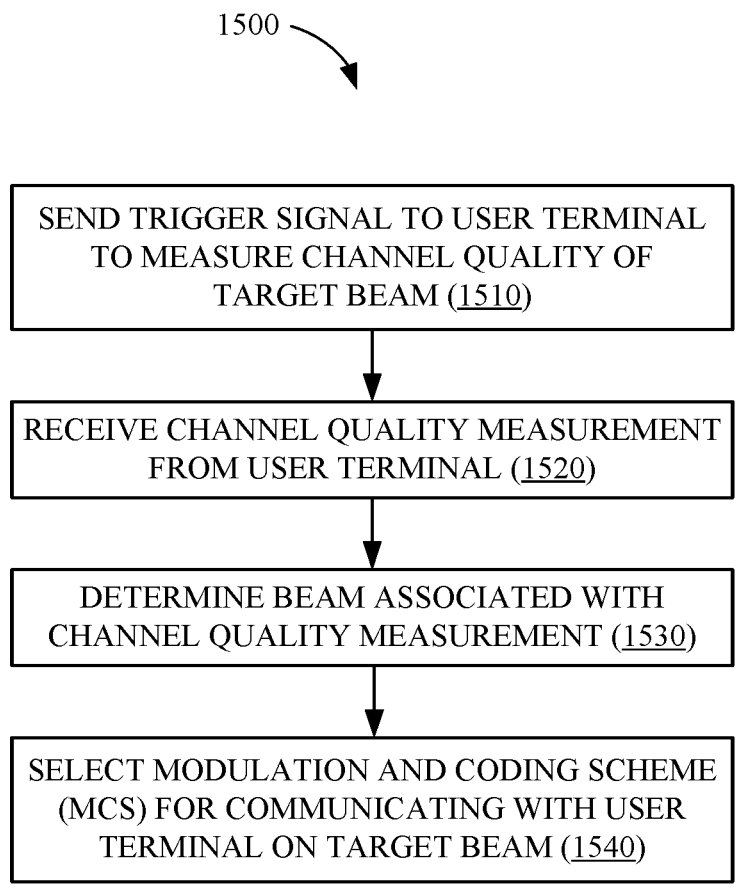
FIG. 15 shows an illustrative flowchart depicting an example operation for selecting a modulation and coding scheme (MCS) based on channel quality feedback for a given beam in a satellite communication system.

Memory 1030 may also include a non-transitory computer-readable storage medium (e.g., one or more nonvolatile memory elements, such as EPROM, EEPROM, Flash memory, a hard drive, and so on) that may store at least the following software (SW) modules:

- a channel quality (CQ) trigger SW module 1034 to transmit a trigger signal to a user terminal for measuring the channel quality of a target beam, for example, as described for one or more operations of FIG. 15;
- a modulation and coding scheme (MCS) selection SW module 1036 to select a MCS for communications on the target beam based at least in part on channel quality information received from the user terminal, for example, as described for one or more operations of FIG. 15; and
  - a beam determination sub-module 1038 to selectively associate the received channel quality information with the target beam, for example, as described for one or more operations of FIG. 15.

Each software module includes instructions that, when executed by processor 1020, cause the network controller 1000 to perform the corresponding functions. The non-transitory computer-readable medium of memory 1030 thus includes instructions for performing all or a portion of the operations of FIG. 15.

Processor 1020 may be any suitable one or more processors capable of executing scripts or instructions of one or more software programs stored in the network controller 1000 (e.g., within memory 1030). For example, processor 1020 may execute the CQ trigger SW module 1034 to transmit a trigger signal to a user terminal for measuring the channel quality of a target beam, for example, based on a beam switching timeline stored in the beam transition table 1032. The processor 1020 may also execute the MCS selection SW module 1036 to select an MCS for communications on the target beam based at least in part on channel quality feedback received from the user terminal, for example, by selecting an MCS that is optimized (e.g., that provides the highest throughput and/or data rate) for communications on the target beam given the associated channel quality of the target beam. In some implementations, the processor 1020 may execute a beam determination sub-module 1038 to selectively associate the received channel quality information with the target beam, for example, based on a timing of, and/or information provided with, the channel quality information (e.g., as described above with respect to FIG. 7).

Figure 11:
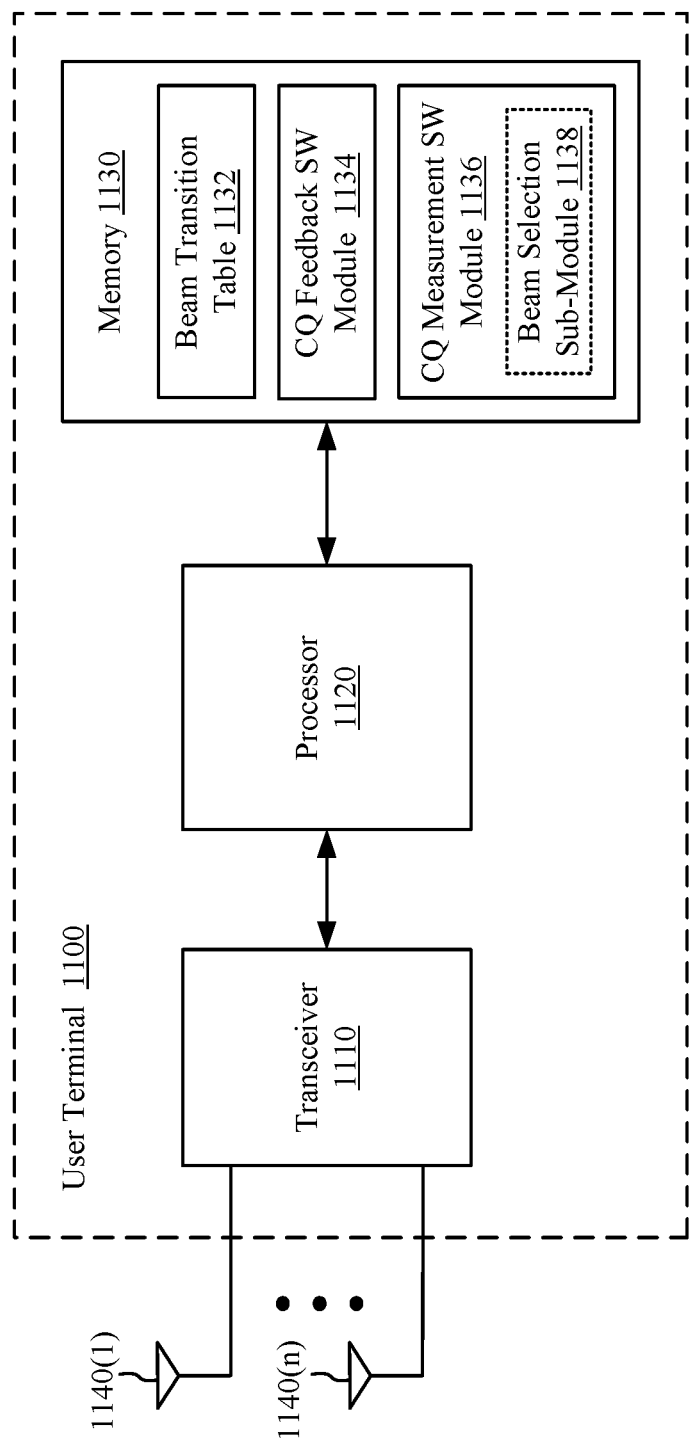
FIG. 11 shows a block diagram of an example UT in accordance with example implementations.

FIG. 11 shows a block diagram of an example user terminal 1100 in accordance with some implementations. The user terminal 1100 may be one implementation of any of the UTs 400 and/or 401 of FIG. 4. The user terminal 1100 includes a transceiver 1110, a processor 1120, a memory 1130, and one or more antennas 1140(1)-1140(n). The transceiver 1110 may be used to transmit signals to and receive signals from satellites, UEs, and/or other suitable wireless devices. In some aspects, the transceiver 1110 may include any number of transceiver chains (not shown for simplicity) that may be coupled to any suitable number of antennas 1140(1)-1140(n). Although not shown in FIG. 11 for simplicity, the user terminal 1100 may include antenna selection logic to selectively couple the transceiver chains of transceiver 1110 to antennas 1140(1)-1140(n).

Memory 1130 includes a beam transition table 1132 for storing beam switching information. The beam switching information may include, for example, a timeline indicating when inter-beam handovers are to occur with a network controller and/or any information needed to perform an inter-beam handover with the network controller. In some aspects, the beam switching information stored in the beam transition table 1132 may match or coincide with corresponding beam switching information stored on a network controller (not shown) in communication with the user terminal 1100.

Figure 12:
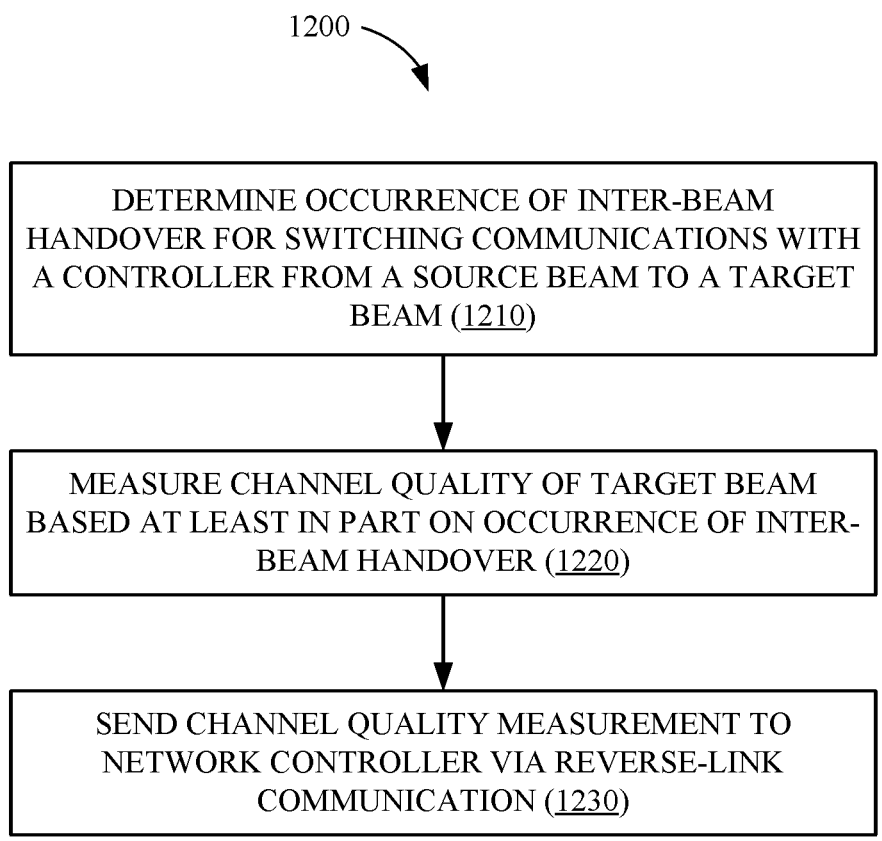
FIG. 12 shows an illustrative flowchart depicting an example operation for providing channel quality feedback based on inter-beam handovers in a satellite communication system.
Figure 13:
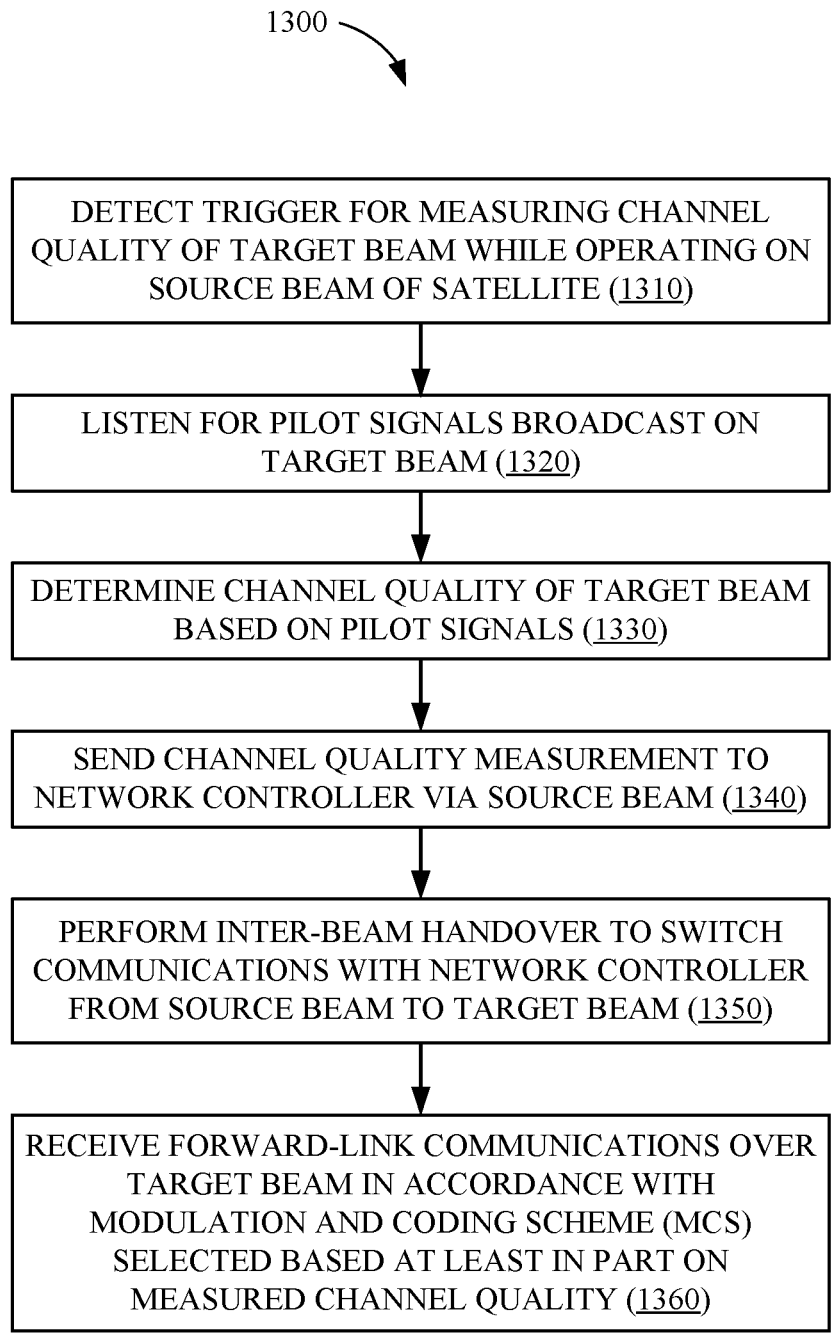
FIG. 13 shows an illustrative flowchart depicting an example operation for providing channel quality feedback for a target beam prior to initiating an inter-beam handover.
Figure 14:
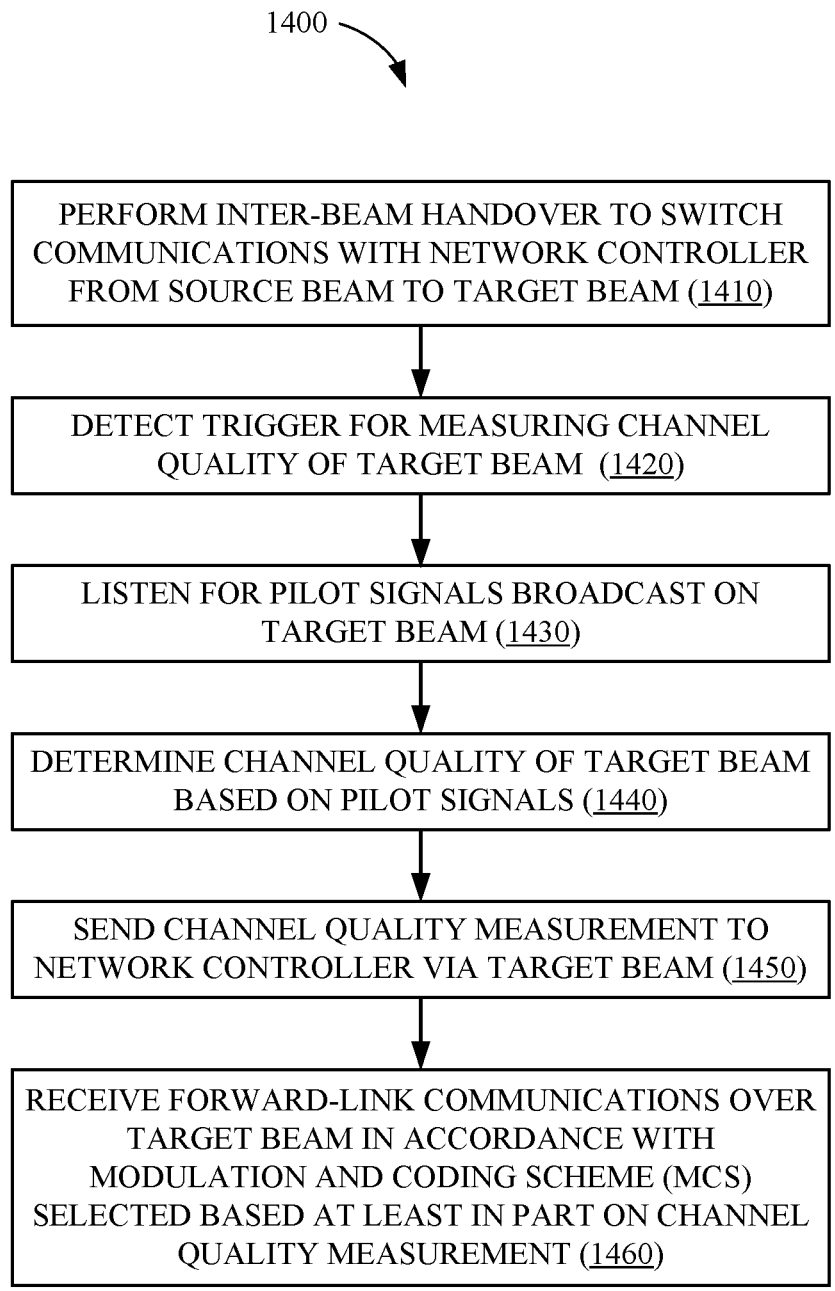
FIG. 14 shows an illustrative flowchart depicting an example operation for providing channel quality feedback for a target beam prior to receiving forward-link communications on the target beam.

Memory 1130 may also include a non-transitory computer-readable medium (e.g., one or more nonvolatile memory elements, such as EPROM, EEPROM, Flash memory, a hard drive, etc.) that may store at least the following software (SW) modules:

- a channel quality (CQ) measurement SW module 1134 to measure the channel quality of a target beam, for example, as described for one or more operations of FIGS. 12-14;
- a CQ feedback SW module 1136 to provide channel quality information for the target beam to a network controller, for example, as described for one or more operations of FIGS. 12-14; and
  - a beam selection sub-module 1138 to selectively transmit the channel quality information to the network controller via a source beam, for example, as described for one or more operations of FIGS. 12 and 13.

Each software module includes instructions that, when executed by processor 1120, cause the user terminal 1100 to perform the corresponding functions. The non-transitory computer-readable medium of memory 1130 thus includes instructions for performing all or a portion of the operations of FIGS. 12-14.

Processor 1120 may be any suitable one or more processors capable of executing scripts or instructions of one or more software programs stored in the user terminal 1100 (e.g., within memory 1130). For example, processor 1120 may execute the CW measurement SW module 1134, for example, by listening for one or more pilot signals on the target beam and determining the channel quality of the target beam based on the detected pilot signals. Processor 1120 may also execute the CQ feedback SW module 1136 to provide channel quality information for the target beam to a network controller, for example, by sending the channel quality information (e.g., as a CQ feedback message) to the network controller via a reverse-link communication. In some aspects, the processor 1120 may execute the beam selection sub-module 1138 to selectively transmit the channel quality information to the network controller via a source beam, for example, by tuning the transceiver 1110 to the source beam. For at least some implementations, the functions performed by executing the CW measurement SW module 1134 and the CQ feedback SW module 1136 may correspond to and/or may be performed by the IBH/CQM device 425 of FIG. 1.

FIG. 12 shows an illustrative flowchart depicting an example operation 1200 for providing channel quality feedback based on inter-beam handovers in a satellite communication system. The example operation 1200 may be performed by the user terminal 1100 depicted in FIG. 11. However, it is to be understood that operation 1200 may be performed by other suitable devices capable of communicating with a network controller (e.g., NAC 150 of FIG. 1) over a satellite network.

First, the user terminal 1100 may determine an occurrence of an inter-beam handover for switching communications with a network controller from a source beam to a target beam (1210). The inter-beam handover may correspond to a beam switching operation that is yet to occur or one that has already occurred. In some aspects, the user terminal 1100 may determine the occurrence of an inter-beam handover based on a beam switching schedule or timeline stored in the beam transition table 1132. In other aspects, the user terminal 1100 may determine the occurrence of an inter-beam handover based on a trigger signal received from the network controller.

The user terminal 1100 may measure the channel quality of the target beam based at least in part on the occurrence of the inter-beam handover (1220). For example, the processor 1120 may execute the CQ measurement SW module 1134 in response to a trigger (e.g., a received CQ trigger signal or an intrinsic CQ trigger) associated with the inter-beam handover. The processor 1120, in executing the CQ measurement SW module 1134, may listen for pilot signals broadcast (e.g., by the network controller) on the target beam. The user terminal 1100 may then determine the channel quality of the target beam based on one or more characteristics (e.g., SNR, SINR, SDNR, etc.) of the received pilot signals.

In some aspects, the user terminal 1100 may measure the channel quality of the target beam prior to initiating the inter-beam handover. For example, as described above with respect to FIGS. 8A-8B, the user terminal 1100 may measure the channel quality of the target beam while remaining in communication with the network controller via the source beam. In other aspects, the user terminal 1100 may measure the channel quality of the target beam within a threshold period of completing the inter-beam handover. For example, as described above with respect to FIGS. 9A-9C, the user terminal 1100 may measure the channel quality of the target beam while also in communication with the network controller via the target beam.

Thereafter, the user terminal 1100 may send the channel quality measurement to the network controller via a reverse-link communication (1230). For example, the processor 1120 may execute the CQ feedback SW module 1136 to send channel quality information, corresponding to the measured channel quality of the target beam, to the network controller via a reverse-link communication (e.g., as a CQ feedback message). In some aspects, the user terminal may transmit the channel quality information to the network controller via the target beam (e.g., as described above with respect to FIGS. 9A-9C). In other aspects, the user terminal may transmit the channel quality information to the network controller via the source beam (e.g., as described above with respect to FIGS. 8A-8B). For example, the processor 1120 may execute the beam selection sub-module 1138 to associate the received channel quality information with the target beam based on timing and/or other information provided with the received channel quality information.

FIG. 13 shows an illustrative flowchart depicting an example operation 1300 for providing channel quality feedback for a target beam prior to initiating an inter-beam handover. The example operation 1300 may be performed by the user terminal (UT) depicted in FIGS. 8A-8B. However, it is to be understood that operation 1300 may be performed by other suitable devices capable of communicating with a network controller (e.g., NAC 150 of FIG. 1) over a satellite network.

The UT may detect a trigger for measuring the channel quality of a target beam of a satellite while operating on a source beam of the satellite (1310). For example, the UT may detect the trigger prior to initiating an inter-beam handover and while the UT is still in communications with the NAC via the source beam. In some aspects, as described above with respect to FIG. 8A, the trigger may correspond to a CQ trigger signal transmitted by the NAC. In other aspects, as described with respect to FIG. 8B, the trigger may correspond to an intrinsic CQ trigger based on an occurrence (e.g., timeline or schedule) of an inter-beam handover.

In response to the detected trigger, the UT may listen for pilot signals broadcast on the target beam (1320). In some implementations, the UT may listen for pilot signals on the target beam while maintaining an active communications link with the NAC via the source beam. For example, the UT may temporarily tune one or more of its transceivers to the target beam to listen for the pilot signals. The UT may then determine a channel quality of the target beam based on the pilot signals (1330). For example, the channel quality may be based on an SNR, SINR, SDNR, and/or any other metric that may be used to describe or otherwise indicate the quality of the communications channel.

The UT may send the channel quality measurement to the NAC via the source beam (1340). For example, because the communications link with the NAC is still active on the source beam, the UT may retune its transceivers to the source beam after acquiring one or more pilot signals from the target beam. The UT may then send a CQ feedback message to the NAC via a reverse-link on the source beam. The CQ feedback message may include channel quality information indicating the measured channel quality of the target beam.

The UT may subsequently perform an inter-beam handover to switch communications with the NAC from the source beam to the target beam (1350). Once the inter-beam handover is completed, the UT may receive forward-link communications over the target beam in accordance with a modulation and coding scheme (MCS) selected based at least in part on the measured channel quality of the target beam (1360). For example, the UT may receive a forward-link grant message from the NAC upon completing the inter-beam handover. For example, the forward-link grant message may be transmitted in accordance with the selected MCS and may enable the UT to begin receiving forward-link communications on the target beam. In some aspects, the forward-link grant message may specify or otherwise indicate the selected MCS to be used for forward-link and/or reverse-link communications on the target beam.

FIG. 14 shows an illustrative flowchart depicting an example operation 1400 for providing channel quality feedback for a target beam prior to receiving forward-link communications on the target beam. The example operation 1400 may be performed by the user terminal (UT) depicted in FIGS. 9A-9C. However, it is to be understood that operation 1400 may be performed by other suitable devices capable of communicating with a network controller (e.g., NAC 150 of FIG. 1) over a satellite network.

First, the UT performs an inter-beam handover to switch communications with a network controller (NAC) from a source beam to a target beam of a satellite (1410). The UT may detect a trigger for measuring the channel quality of the target beam (1420). For example, the UT may detect the trigger within a threshold period of completing the inter-beam handover. In some aspects, the trigger may correspond to a CQ trigger signal transmitted by the NAC, as described above with respect to FIG. 9A. In other aspects, the trigger may correspond to an intrinsic CQ trigger based on an occurrence (e.g., timeline or schedule) of an inter-beam handover, as described above with respect to FIGS. 9B-9C.

In response to the detected trigger, the UT may listen for pilot signals broadcast on the target beam (1430). Since the UT is already operating on the target beam, it may not need to retune its transceivers (e.g., to a different beam) to listen for the pilot signals. The UT may then determine a channel quality of the target beam based on the pilot signals (1440). For example, the channel quality may be based on an SNR, SINR, SDNR, and/or any other metric that may be used to describe or otherwise indicate the quality of the communications channel.

The UT may send the channel quality measurement to the NAC via the target beam (1450). For example, because the communications link with the NAC is currently active on the target beam, the UT may send the channel quality measurement to the NAC without retuning its transceivers. Thus, the UT may send a CQ feedback message to the NAC via a reverse-link on the target beam. The CQ feedback message may include channel quality information indicating the measured channel quality of the target beam.

The UT may subsequently receive forward-link communications over the target beam in accordance with a modulation and coding scheme (MCS) selected based at least in part on the measured channel quality of the target beam (1460). For example, the UT may receive a forward-link grant message from the NAC in response to the CQ feedback message. The forward-link grant message may be transmitted in accordance with the selected MCS and may enable the UT to begin receiving forward-link communications on the target beam. In some aspects, the forward-link grant message may specify or otherwise indicate the selected MCS to be used for forward-link and/or reverse-link communications on the target beam.

FIG. 15 shows an illustrative flowchart depicting an example operation 1500 for selecting a modulation and coding scheme (MCS) based on channel quality feedback for a given beam in a satellite communication system. The example operation 1500 may be performed by the network controller 1000 depicted in FIG. 10. However, it is to be understood that operation 1500 may be performed by other suitable controllers and/or by any suitable components of the NAC 150 of FIG. 1.

First, the network controller 1000 sends a trigger signal to a user terminal to measure the channel quality of a target beam (1510). For example, the processor 1020 may execute the CQ trigger SW module 1034 to transmit the trigger signal to the user terminal based on a beam switching timeline stored in the beam transition table 1032. In some aspects, the network controller 1000 may transmit the trigger signal at least a threshold duration prior to initiating an inter-beam handover (e.g., as described above with respect to FIG. 8A). In other aspects, the network controller 1000 may transmit the trigger signal within a threshold period of completing an inter-beam handover (e.g., as described above with respect to FIG. 9A). The trigger signal may cause the user terminal to measure the channel quality of the target beam.

The network controller 1000 subsequently receives a channel quality measurement for the target beam from the user terminal (1520). For example, the channel quality measurement may be received as a feedback message that includes channel quality information for the target beam. In some implementations, the network controller 1000 may determine a beam associated with the received channel quality measurement (1530). For example, as described with respect to FIGS. 8A-8B, the network controller 1000 may receive the feedback message via the source beam, although the feedback message includes channel quality information for the target beam. Thus, the processor 1020 may execute the beam determination sub-module 1038 to associate the received channel quality information with the target beam, for example, based on a timing of, and/or information provided with, the channel quality information (e.g., as described above with respect to FIG. 7).

Finally, the network controller 1000 may select a modulation and coding scheme (MCS) to be used for communicating with the user terminal on the target beam (1540). For example, the processor 1020 may execute the MCS selection SW module 1036 to select an MCS that optimizes (e.g., that provides the highest throughput and/or data rate for) communications with the user terminal on the target beam given the channel quality of the target beam. The network controller 1000 may subsequently transmit forward-link communications on the target beam (e.g., to the user terminal) in accordance with the selected MCS. In some implementations, the network controller 1000 may provide the selected MCS to the user terminal (e.g., with a forward-link grant message), for example, to be used for reverse-link communications on the target beam.

Figure 16:
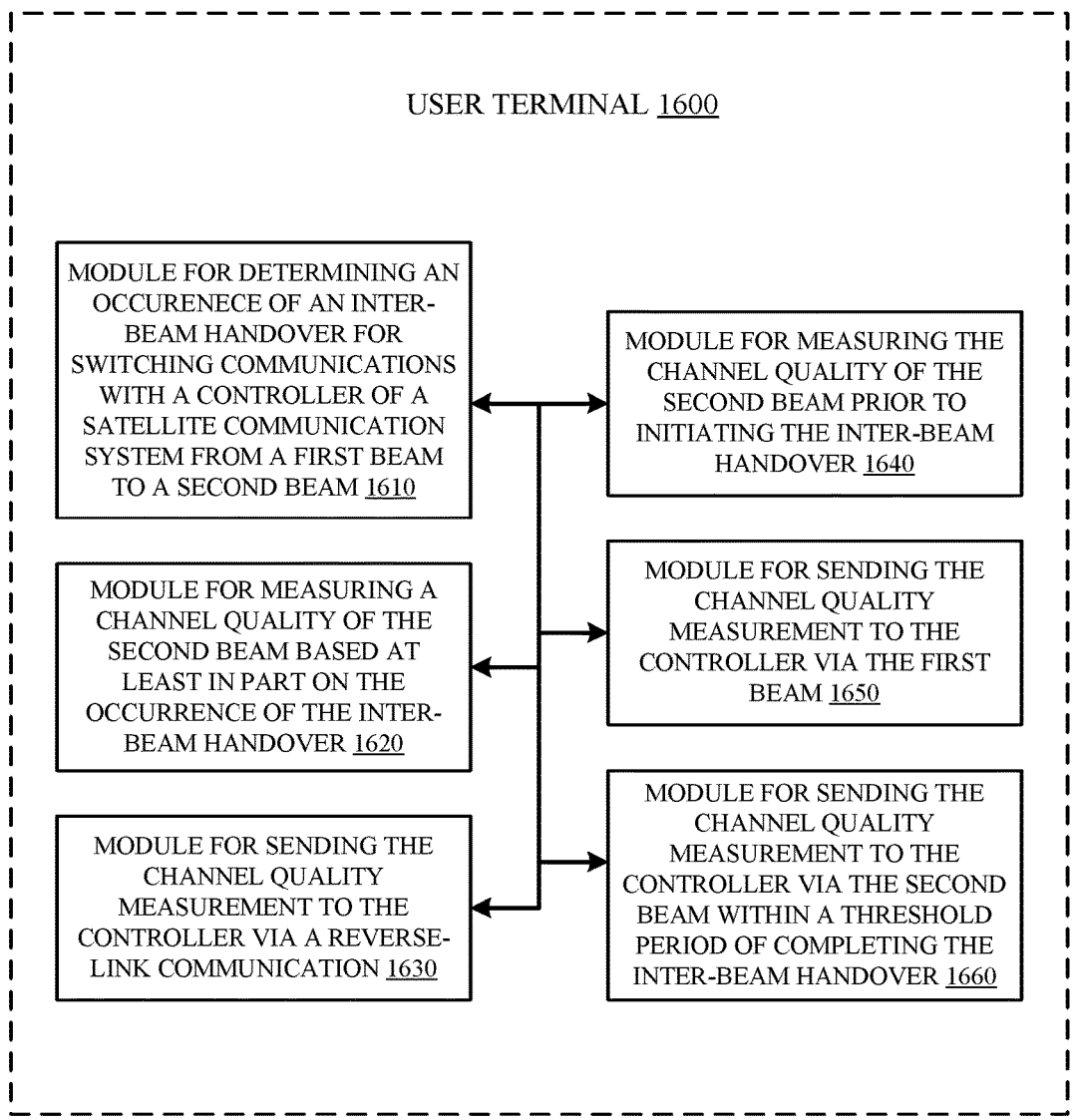
FIG. 16 shows an example user terminal represented as a series of interrelated functional modules.

FIG. 16 shows an example user terminal 1600 represented as a series of interrelated functional modules. A module 1610 for determining an occurrence of an inter-beam handover for switching communications with a controller of a satellite system from a first beam to a second beam may correspond at least in some aspects to, for example, a processor as discussed herein (e.g., processor 1120). A module 1620 for measuring a channel quality of the second beam based at least in part on the occurrence of the inter-beam handover may correspond at least in some aspects to, for example, a processor as discussed herein (e.g., processor 1120). A module 1630 for sending the channel quality measurement to the controller via a reverse-link communication may correspond at least in some aspects to, for example, a processor as discussed herein (e.g., processor 1120) and/to a transceiver as discussed herein (e.g., transceiver 1110).

A module 1640 for measuring the channel quality of the second beam prior to initiating the inter-beam handover may correspond at least in some aspects to, for example, a processor as discussed herein (e.g., processor 1120). A module 1650 for sending the channel quality measurement to the controller via the first beam may correspond at least in some aspects to, for example, a processor as discussed herein (e.g., processor 1120) and/to a transceiver as discussed herein (e.g., transceiver 1110). A module 1660 for measuring the channel quality of the second beam within a threshold period of completing the inter-beam handover may correspond at least in some aspects to, for example, a processor as discussed herein (e.g., processor 1120).

The functionality of the modules of FIG. 16 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIG. 16, as well as other components and functions described herein, may be implemented using any suitable means. Such means also may be implemented, at least in part, using corresponding structure as taught herein. For example, the components described above in conjunction with the "module for" components of FIG. 16 also may correspond to similarly designated "means for" functionality. Thus, in some aspects one or more of such means may be implemented using one or more of processor components, integrated circuits, or other suitable structure as taught herein.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, one aspect of the disclosure can include a non-transitory computer readable media embodying a method for time and frequency synchronization in non-geosynchronous satellite communication systems. The term "non-transitory" does not exclude any physical storage medium or memory and particularly does not exclude dynamic memory (e.g., conventional random access memory (RAM)) but rather excludes only the interpretation that the medium can be construed as a transitory propagating signal.

While the foregoing disclosure shows illustrative aspects, it should be noted that various changes and modifications could be made herein without departing from the scope of the appended claims. The functions, steps or actions of the method claims in accordance with aspects described herein need not be performed in any particular order unless expressly stated otherwise. Furthermore, although elements may be described or claimed in the singular, the plural is contemplated unless limitation to the singular is explicitly stated. Accordingly, the disclosure is not limited to the illustrated examples and any means for performing the functionality described herein are included in aspects of the disclosure.

What is claimed is:

1. A method of operating a user terminal in a satellite communication system, the method comprising:
   detecting an occurrence of an inter-beam handover for switching communications with a controller of the satellite communication system from a first beam to a second beam;
   measuring a channel quality of the second beam in response to detecting the occurrence of the inter-beam handover, wherein a timing of the channel quality measurement depends on a timing of the inter-beam handover;
   sending the channel quality measurement to the controller via a reverse-link communication, wherein the channel quality measurement is sent to the controller via the second beam within a threshold period after completing the inter-beam handover and prior to receiving forward-link communications on the second beam; and
   receiving forward-link communications on the second beam, after the inter-beam handover, in accordance with a modulation and coding scheme (MCS) that is based at least in part on the channel quality measurement.

2. The method of claim 1, wherein the detection is based on beam transition information.

3. The method of claim 1, wherein the detection is based on a trigger signal received from the controller.

4. The method of claim 1, wherein the measuring comprises:
   receiving one or more pilot signals on the second beam; and
   determining the channel quality of the second beam based at least in part on the received pilot signals.

5. The method of claim 1, wherein the measuring is performed prior to initiating the inter-beam handover.

6. The method of claim 1, wherein the first beam and the second beam are provided by a first satellite.

7. The method of claim 1, wherein the first beam is provided by a first satellite and the second beam is provided by a second satellite.

8. A user terminal, comprising:
   one or more processors; and
   a memory configured to store instructions that, when executed by the one or more processors, cause the user terminal to:
      detect an occurrence of an inter-beam handover for switching communications with a controller of a satellite communication system from a first beam to a second beam;
      measure a channel quality of the second beam in response to detecting the occurrence of the inter-beam handover, wherein a timing of the channel quality measurement depends on a timing of the inter-beam handover;
      send the channel quality measurement to the controller via a reverse-link communication, wherein the channel quality measurement is sent to the controller via the second beam within a threshold period after completing the inter-beam handover and prior to receiving forward-link communications on the second beam; and
      receive forward-link communications on the second beam, after the inter-beam handover, in accordance with a modulation and coding scheme (MCS) that is based at least in part on the channel quality measurement.

9. The user terminal of claim 8, wherein the detection is based on beam transition information.

10. The user terminal of claim 8, wherein the detection is based on a trigger signal received from the controller.

11. The user terminal of claim 8, wherein execution of the instructions to measure the channel quality of the second beam causes the user terminal to:
receive one or more pilot signals on the second beam; and
determine the channel quality of the second beam based at least in part on the received pilot signals.

12. The user terminal of claim 8, wherein the measuring is performed prior to initiating the inter-beam handover.

13. The user terminal of claim 8, wherein the first beam and the second beam are provided by a first satellite.

14. The user terminal of claim 8, wherein the first beam is provided by a first satellite and the second beam is provided by a second satellite.

15. A user terminal, comprising:
means for detecting an occurrence of an inter-beam handover for switching communications with a controller of a satellite communication system from a first beam to a second beam;
means for measuring a channel quality of the second beam in response to detecting the occurrence of the inter-beam handover, wherein a timing of the channel quality measurement depends on a timing of the inter-beam handover;
means for sending the channel quality measurement to the controller via a reverse-link communication, wherein the channel quality measurement is sent to the controller via the second beam within a threshold period after completing the inter-beam handover and prior to receiving forward-link communications on the second beam; and
means for receiving forward-link communications on the second beam, after the inter-beam handover, in accordance with a modulation and coding scheme (MCS) that is based at least in part on the channel quality measurement.

16. The user terminal of claim 15, wherein the detection is based on at least one of beam transition information or a trigger signal received from the controller.

17. The user terminal of claim 15, wherein the means for measuring the channel quality of the second beam is to:
receive one or more pilot signals on the second beam; and
determine the channel quality of the second beam based at least in part on the received pilot signals.

18. The user terminal of claim 15, wherein the measuring is performed prior to initiating the inter-beam handover.

19. The user terminal of claim 15, wherein the first beam and the second beam are provided by a first satellite.

20. The user terminal of claim 15, wherein the first beam is provided by a first satellite and the second beam is provided by a second satellite.

21. A non-transitory computer-readable medium storing instructions that, when executed by one or more processors of a user terminal, cause the user terminal to perform operations comprising:
detecting an occurrence of an inter-beam handover for switching communications with a controller of a satellite communication system from a first beam to a second beam;
measuring a channel quality of the second beam in response to detecting the occurrence of the inter-beam handover, wherein a timing of the channel quality measurement depends on a timing of the inter-beam handover;
sending the channel quality measurement to the controller via a reverse-link communication, wherein the channel quality measurement is sent to the controller via the second beam within a threshold period after completing the inter-beam handover and prior to receiving forward-link communications on the second beam; and
receiving forward-link communications on the second beam, after the inter-beam handover, in accordance with a modulation and coding scheme (MCS) that is based at least in part on the channel quality measurement.

22. The non-transitory computer-readable medium of claim 21, wherein the detection is based on at least one of beam transition information or a trigger signal received from the controller.

23. The non-transitory computer-readable medium of claim 21, wherein execution of the instructions for measuring the channel quality of the second beam causes the user terminal to perform operations further comprising:
receiving one or more pilot signals on the second beam; and
determining the channel quality of the second beam based at least in part on the received pilot signals.

24. The non-transitory computer-readable medium of claim 21, wherein the measuring is performed prior to initiating the inter-beam handover.

25. The non-transitory computer-readable medium of claim 21, wherein the first beam and the second beam are provided by a first satellite.

26. The non-transitory computer-readable medium of claim 21, wherein the first beam is provided by a first satellite and the second beam is provided by a second satellite.

* * * * *